(12) United States Patent
Yang et al.

(10) Patent No.: US 9,510,365 B2
(45) Date of Patent: Nov. 29, 2016

(54) SIGNAL-TRANSCEIVING METHOD, AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 14/390,635

(22) PCT Filed: Apr. 26, 2013

(86) PCT No.: PCT/KR2013/003619
§ 371 (c)(1),
(2) Date: Oct. 3, 2014

(87) PCT Pub. No.: WO2013/162321
PCT Pub. Date: Oct. 31, 2013

(65) Prior Publication Data
US 2015/0078222 A1    Mar. 19, 2015

Related U.S. Application Data

(60) Provisional application No. 61/638,502, filed on Apr. 26, 2012.

(51) Int. Cl.
| | |
|---|---|
| H04W 72/12 | (2009.01) |
| H04B 7/26 | (2006.01) |
| H04L 5/00 | (2006.01) |
| H04L 5/14 | (2006.01) |
| H04L 27/26 | (2006.01) |

(52) U.S. Cl.
CPC ....... *H04W 72/1284* (2013.01); *H04B 7/2656* (2013.01); *H04L 5/0092* (2013.01); *H04W 72/1257* (2013.01); *H04W 72/1268* (2013.01); *H04L 5/1469* (2013.01); *H04L 27/2602* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2010/0027446 A1 | 2/2010 | Choi et al. | |
| 2010/0246456 A1* | 9/2010 | Suo | H04W 56/003 370/280 |
| 2011/0176461 A1 | 7/2011 | Astely et al. | |
| 2012/0039278 A1 | 2/2012 | Park et al. | |
| 2012/0076017 A1 | 3/2012 | Luo et al. | |
| 2012/0213189 A1 | 8/2012 | Choi et al. | |

FOREIGN PATENT DOCUMENTS

KR    10-2011-0049623 A    5/2011

* cited by examiner

*Primary Examiner* — Kouroush Mohebbi
(74) *Attorney, Agent, or Firm* — Birch, Stewart, Kolasch & Birch, LLP

(57) ABSTRACT

The present invention relates to a wireless communication system. More particularly, the present invention relates to a method and apparatus for transmitting an uplink signal in a time division duplex (TDD)-based wireless communication system. The method comprises the steps of receiving scheduling information for data transmission in a first uplink subframe, and transmitting uplink data based on the scheduling information. The uplink data transmission period includes the first uplink subframe, and further includes, if the second subframe immediately before the first uplink subframe is a subframe including a downlink period, a guard period and an uplink period, and if a predetermined condition is satisfied, an uplink period of a second subframe.

10 Claims, 15 Drawing Sheets

(a)

(b)

FIG. 13
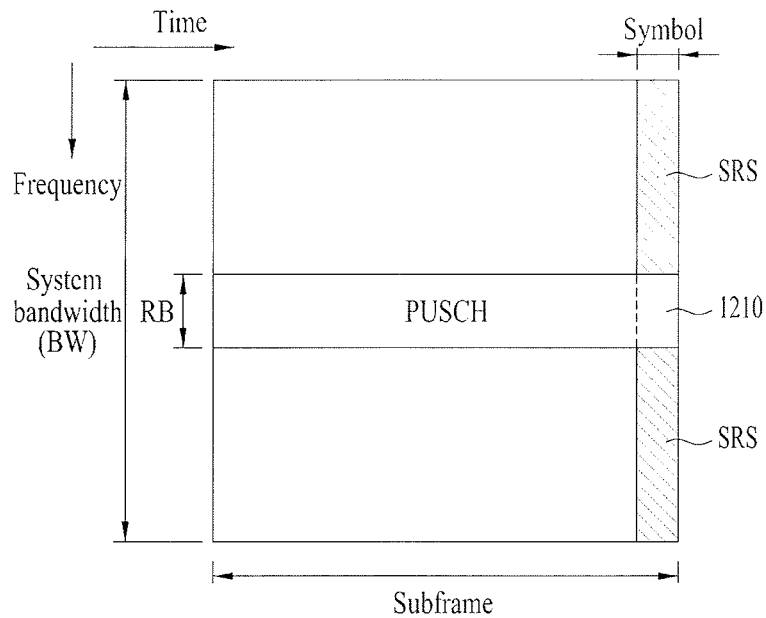
(a)
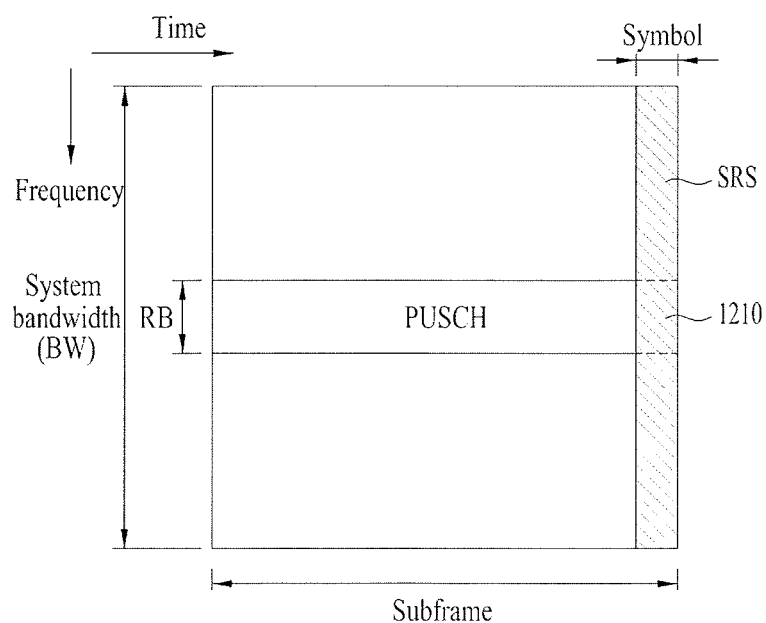
(b)

FIG. 15
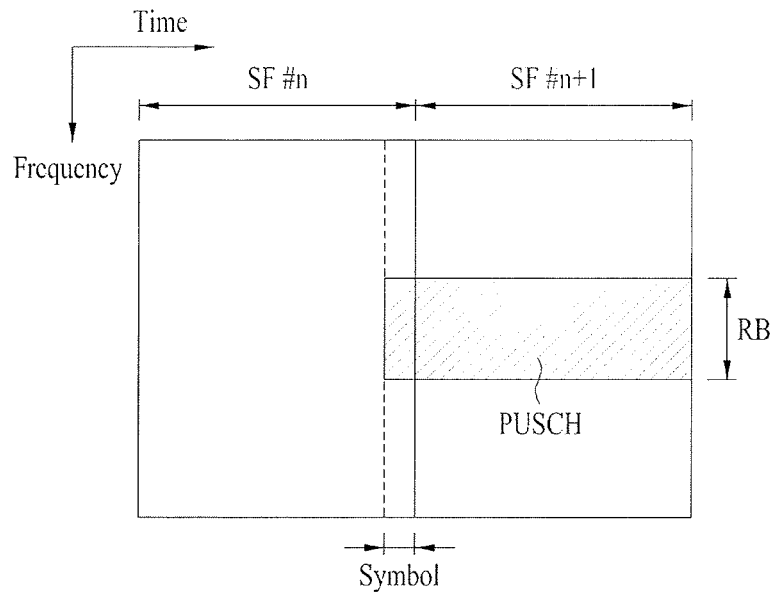
(a)
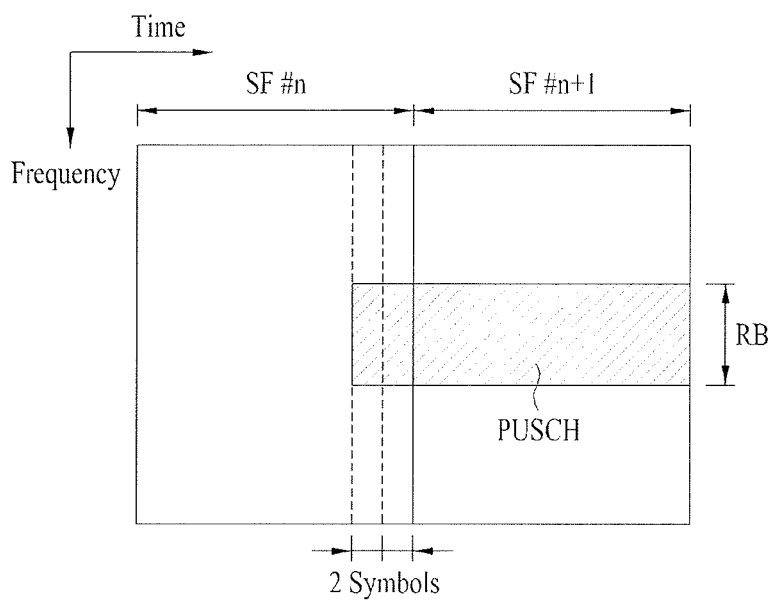
(b)

US 9,510,365 B2

SIGNAL-TRANSCEIVING METHOD, AND APPARATUS THEREFOR

CROSS REFERENCE TO RELATED APPLICATIONS

This application is the National Phase of PCT/KR2013/003619 filed on Apr. 26, 2013, which claims priority under 35 U.S.C. 119(e) to U.S. Provisional Application No. 61/638,502 filed on Apr. 26, 2012, all of which are hereby expressly incorporated by reference into the present application.

TECHNICAL FIELD

The present invention relates to a wireless access system, and more particularly, to a method for efficiently transmitting and receiving data and an apparatus therefor.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide a method for efficiently transmitting and receiving a signal in a wireless communication system and an apparatus therefor.

Also, another object of the present invention is to provide a method for efficiently transmitting and receiving data in a wireless communication system and an apparatus therefor.

Also, other object of the present invention is to provide a method for efficiently transmitting and receiving data in a wireless communication system in which a new type carrier is additionally used as compared with a conventional LTE (-A) system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting an uplink signal by a user equipment in a time division duplex (TDD)-based wireless communication system comprises receiving scheduling information for data transmission in a first uplink subframe; and transmitting uplink data in accordance with the scheduling information, wherein a transmission period for the uplink data includes the first uplink subframe, and wherein when a second subframe just before the first uplink subframe is a subframe including a downlink period, a guard period and an uplink period, and when a predetermined condition is satisfied, the transmission period further includes the uplink period of the second subframe.

Preferably, the predetermined condition may include that the scheduling information includes a specific indicator or a specific field of the scheduling information has a predetermined value.

Preferably, the method may further comprise receiving control information through radio resource control (RRC) layer signaling, wherein the predetermined condition may include that the control information includes a specific indicator.

Preferably, the predetermined condition may include that an uplink reference signal is not configured to be transmitted through at least part of the uplink period of the second subframe.

Preferably, the predetermined condition may include that an interval between a subframe at which the scheduling information is received and the uplink subframe is greater than a specific number of subframes.

Preferably, when the transmission period for the uplink data further includes the uplink period of the second subframe, a size of the uplink data may be determined using second information about the number of resource blocks obtained by multiplying a specific weighting factor by first information about the number of resource blocks included in the scheduling information.

More preferably, the second information about the number of resource blocks may be determined by $N_{PRB} = \max\{\lfloor N'_{PRB} \times (N_s + N_u)/N_s \rfloor, 1\}$, where $N'_{PRB}$ corresponds to the first information about the number of resource blocks, $N_{PRB}$ corresponds to the second information about the number of resource blocks, $N_s$ represents the number of symbols allocated for transmission of the uplink data, and $N_u$ represents the number of symbols at which the uplink data can be transmitted at the uplink period of the second subframe.

In another aspect of the present invention, a user equipment configured to transmit an uplink signal in a time division duplex (TDD)-based wireless communication system comprises a radio frequency (RF) module; and a processor, wherein the processor is configured to receive scheduling information for data transmission in a first uplink subframe and transmit uplink data in accordance with the scheduling information, wherein a transmission period for the uplink data includes the first uplink subframe, and wherein when a second subframe just before the first uplink subframe is a subframe including a downlink period, a guard period and an uplink period, and when a predetermined condition is satisfied, the transmission period further includes the uplink period of the second subframe.

Preferably, the predetermined condition may include that the scheduling information includes a specific indicator or a specific field of the scheduling information has a predetermined value.

Preferably, the processor may further be configured to receive control information through radio resource control (RRC) layer signaling, wherein the predetermined condition may include that the control information includes a specific indicator.

Preferably, the predetermined condition may include that an uplink reference signal is not configured to be transmitted through at least part of the uplink period of the second subframe.

Preferably, the predetermined condition may include that an interval between a subframe at which the scheduling information is received and the uplink subframe is greater than a specific number of subframes.

Preferably, when the transmission period for the uplink data further includes the uplink period of the second subframe, a size of the uplink data may be determined using second information about the number of resource blocks obtained by multiplying a specific weighting factor by first information about the number of resource blocks included in the scheduling information.

More preferably, the second information about the number of resource blocks may be determined by $N_{PRB}=\max\{\lfloor N'_{PRB} \times (N_s+N_u)/N_s \rfloor, 1\}$, where $N'_{PRB}$ corresponds to the first information about the number of resource blocks, $N_{PRB}$ corresponds to the second information about the number of resource blocks, $N_s$ represents the number of symbols allocated for transmission of the uplink data, and $N_u$ represents the number of symbols at which the uplink data can be transmitted at the uplink period of the second subframe.

Advantageous Effects

According to the present invention, a signal may be transmitted and received efficiently in a wireless communication system.

Also, according to the present invention, data may be transmitted and received efficiently in the wireless communication system.

Also, according to the present invention, data may be transmitted and received efficiently in a wireless communication system in which a new type carrier is additionally used as compared with the conventional LTE(-A) system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram illustrating an example of transmitting uplink data in accordance with a method 1;

FIG. 15 is a diagram illustrating that uplink data are transmitted for both a special (S) subframe and UL subframe in accordance with a method 2.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and LTE-advanced (LTE-A) is an evolved version of the 3GPP LTE. In this specification, the LTE system may refer to a system based on 3GPP 36 series TS (Technical Specification) release-8. Also, in this specification, the LTE(-A) system may refer to a system based on 3GPP 36 series TS release-8, 9, 10. For clarification of the description, although the following embodiments will be described based on the 3GPP LTE/LTE-A, it is to be understood that the technical spirits of the present invention are not limited to the 3GPP LTE/LTE-A.

In a wireless communication system, a user equipment receives information from a base station through a downlink (DL), and transmits information to the base station through an uplink (UL). Information transmitted and received between the base station and the user equipment includes data and various kinds of control information, and various physical channels exist in accordance with a type/usage of the information transmitted and received between the base station and the user equipment.

Figure 1:
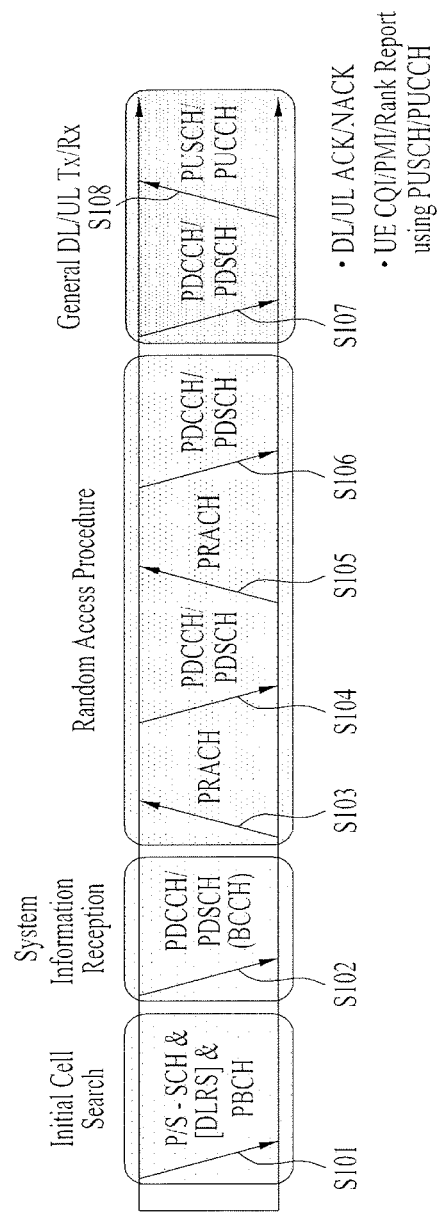
FIG. 1 is a diagram illustrating physical channels used in an LTE system and a general method for transmitting a signal using the physical channels.

FIG. 1 is a diagram illustrating physical channels used in an LTE system and a general method for transmitting a signal using the physical channels.

The user equipment, of which power is turned on, or which newly enters a cell, performs initial cell search such as synchronizing with the base station at step S101. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), and CSI (Channel State Information). The CSI includes CQI (channel quality indicator), PMI (precoding matrix indicator), RI (rank indication) information, etc. Although the UCI is generally transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
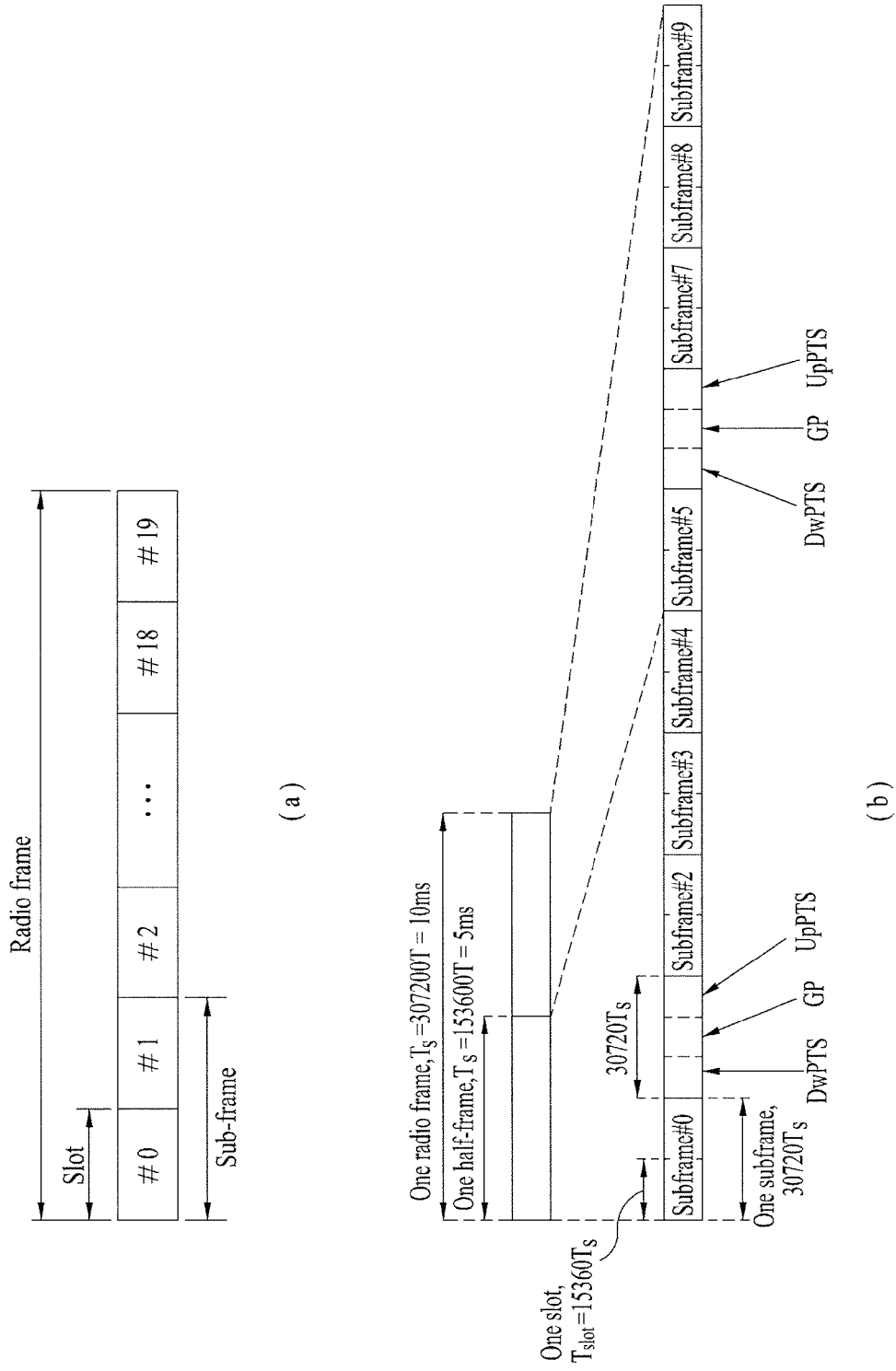
FIG. 2 is a diagram illustrating a structure of a radio frame used in an LTE system.

FIG. 2 is a diagram illustrating a structure of a radio frame used in an LTE system. In a cellular OFDM wireless packet communication system, uplink/downlink data packet transmission is performed in a subframe (SF) unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols are intended to express one symbol interval. The OFDM symbols may be referred to as one SC-FDMA symbols or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes five subframes, a downlink period (for example, a downlink pilot time slot (DwPTS)), a guard period (GP), and an uplink period (for example, upilot time slot (UpPTS)). One of the five subframes includes two slots. For example, the downlink period (for example, DwPTS) is used for initial cell search, synchronization or channel estimation at the user equipment. For example, the uplink period (for example, UpPTS) is used for channel estimation at the base station and uplink transmission synchronization of the user equipment. For example, a sounding reference signal (SRS) for channel estimation at the base station may be transmitted for the uplink period (for example, UpPTS), and a physical random access channel (PRACH) for carrying a random access preamble for uplink transmission synchronization may also be transmitted for the uplink period. The guard period is to remove interference occurring in the uplink due to multipath delay of downlink signals between the uplink and the downlink. Table 1 illustrates uplink-downlink configuration of subframes within the radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D represents a downlink subframe (DL SF), U represents an uplink subframe (UL SF), and S represents a special subframe. The special subframe includes a downlink period (DwPTS), a guard period (GP), and an uplink period (for example, UpPTS). Table 2 illustrates a configuration of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The aforementioned structure of the radio frame is only exemplary, and various modifications may be made in the number of subframes included in the radio frame or the number of slots included in the subframe, or the number of symbols included in the slot.

Figure 3:
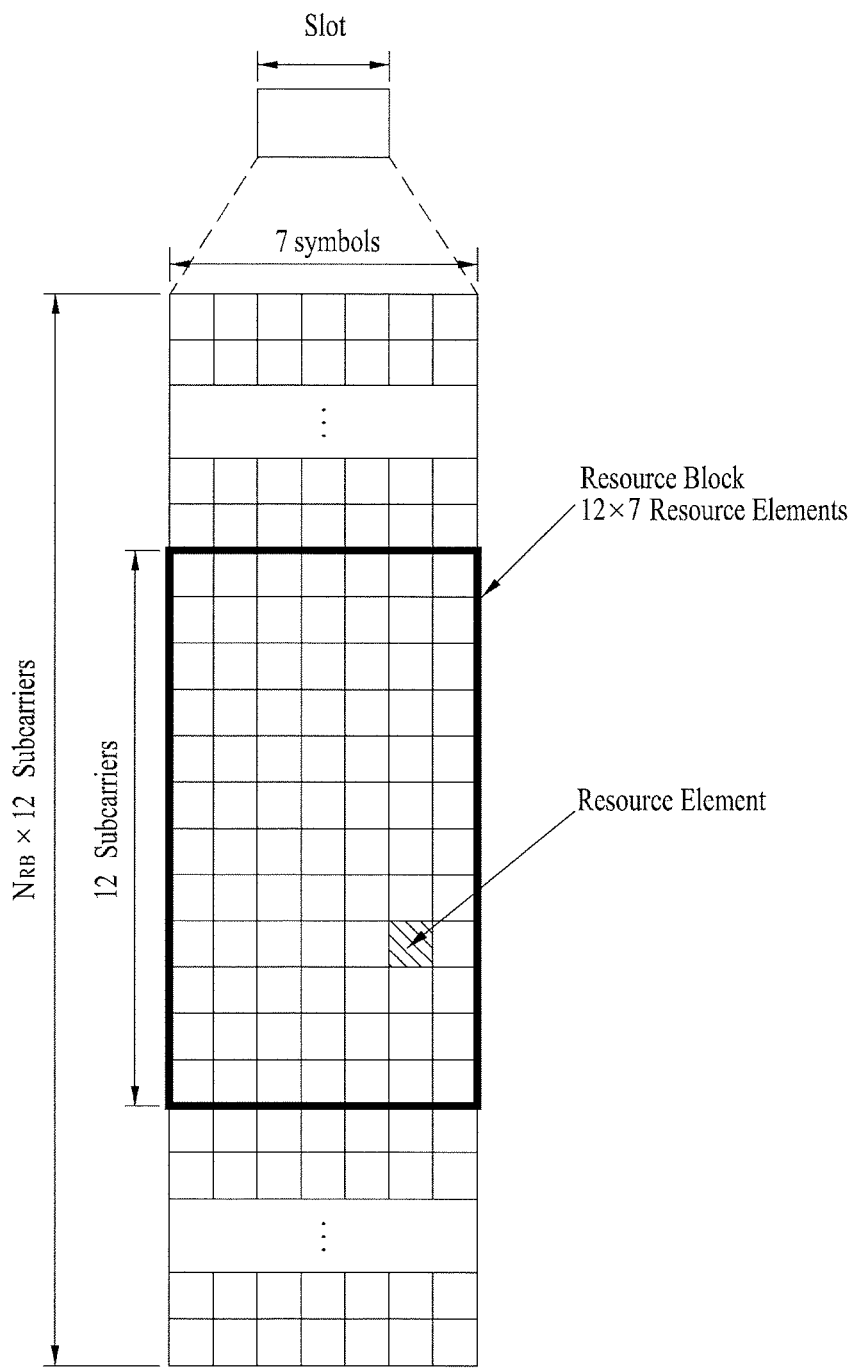
FIG. 3 is a diagram illustrating an example of a resource grid of a downlink slot used in an LTE system.

FIG. 3 is a diagram illustrating a resource grid for a downlink slot used in an LTE system.

Referring to FIG. 3, the downlink slot includes a plurality of OFDM symbols in a time domain. In this case, one downlink slot includes, but not limited to, seven OFDM symbols, and one resource block (RB) includes, but not limited to, twelve subcarriers in a frequency domain. Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 4:
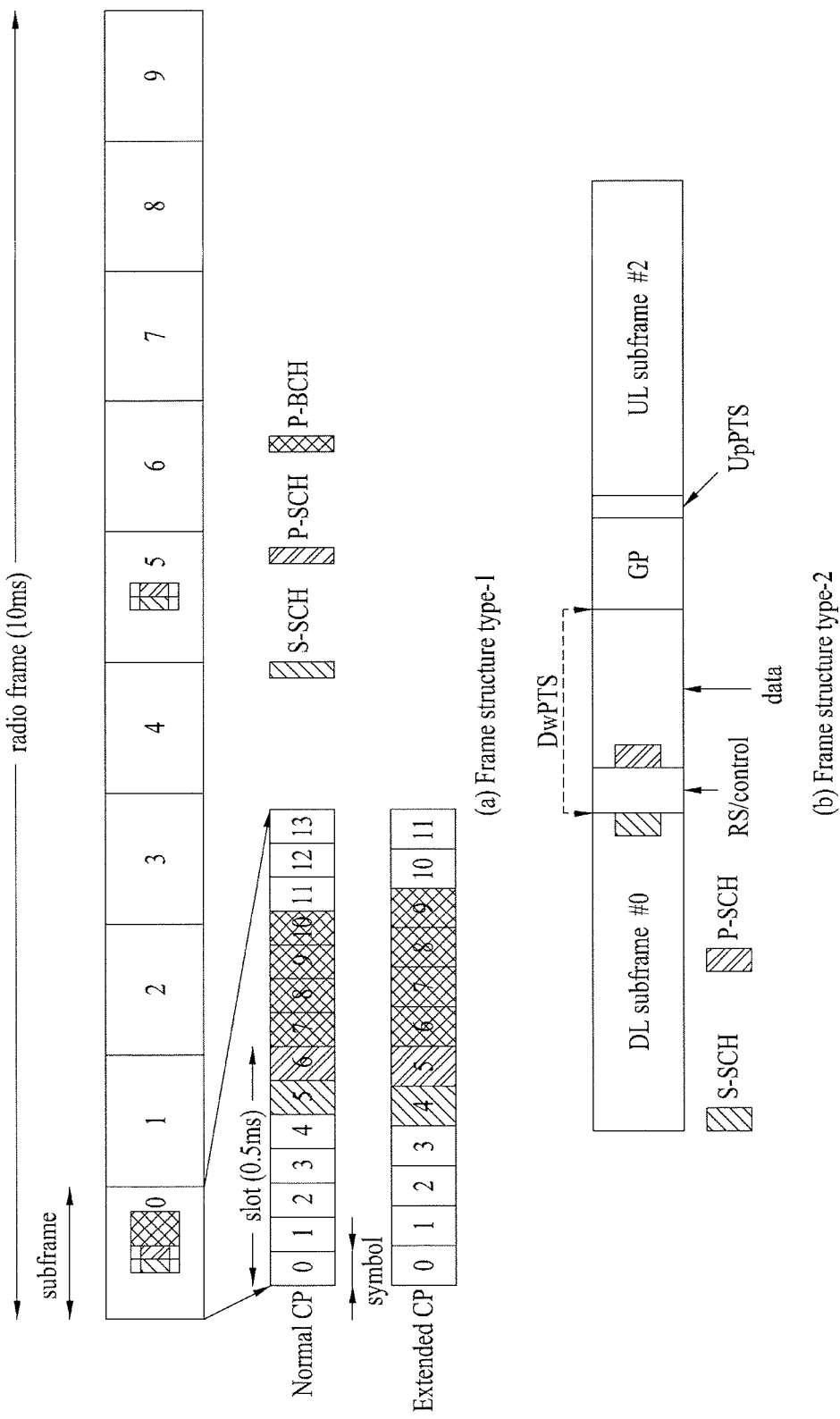
FIG. 4 is a diagram illustrating P-BCH (Primary broadcast channel) and SCH (Synchronization channel)

FIG. 4 is a diagram illustrating P-BCH (Primary broadcast channel) and SCH (Synchronization channel). The SCH includes a P-SCH and an S-SCH. The P-SCH carriers a primary synchronization signal (PSS), and the S-SCH carriers a secondary synchronization signal (SSS).

Referring to FIG. 4, in the type 1 radio frame structure (that is, FDD), the P-SCH is located at the last OFDM symbol of slot #0 (that is, first slot of subframe #0) and slot #10 (that is, first slot of subframe #5) every radio frame. The S-SCH is located at an OFDM symbol just prior to the last OFDM symbol of the slot #0 and the slot #10 at every radio frame. The S-SCH and the P-SCH are located at neighboring OFDM symbols. In the type 2 radio frame structure (that is, TDD), the P-SCH is transmitted through a third OFDM symbol of subframe #1/#6, and the S-SCH is located at the last OFDM symbol of slot #1 (that is, second slot of subframe #0) and slot #11 (that is, second slot of subframe #5). The P-BCH is transmitted per four radio frames regardless of the frame structure type, and is transmitted using first to fourth OFDM symbols of the second slot of the subframe #0. The P-SCH is transmitted using 72 subcarriers (10 subcarriers are reserved, and 62 subcarriers are used for PSS transmission) on the basis of a direct current (DC) subcarrier within the OFDM symbols. The S-SCH is transmitted using 72 subcarriers (10 subcarriers are reserved, and 62 subcarriers are used for SSS transmission) on the basis of a DC subcarrier within the OFDM symbols. The P-BCH is mapped into 72 subcarriers on the basis of 4 OFDM symbols and the DC subcarrier within one subframe.

Figure 5:
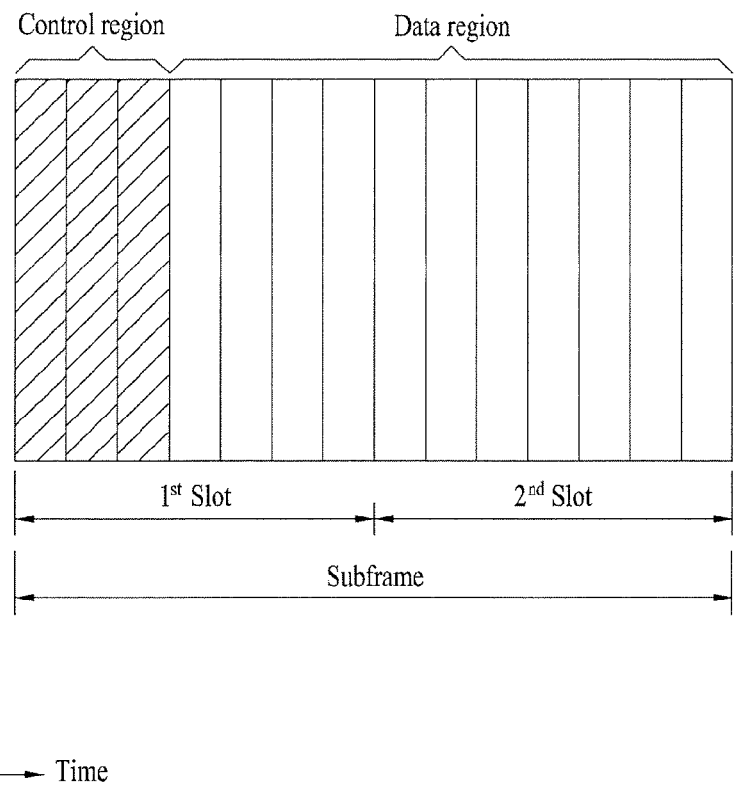
FIG. 5 is a diagram illustrating a structure of a downlink subframe used in an LTE system.

FIG. 5 is a diagram illustrating a structure of a downlink subframe used in an LTE system.

Referring to FIG. 5, maximum three (four) OFDM symbols located at the front of the first slot within one subframe correspond to a control region for allocation of a control channel. The other OFDM symbols correspond to a data region to which a physical downlink shared channel (PD-CCH) is allocated, wherein a basic resource unit of the data region is RB. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted at the first OFDM symbol of the subframe, and carries information about the number of OFDM symbols used for transmission of the control channel within the subframe. The PHICH is a response to uplink transmission, and carries HARQ ACK/NACK (acknowledgement/negative-acknowledgement) signal. The PDCCH carries downlink control information (DCI). The DCI may include uplink or downlink scheduling information or uplink transmission power control command for a random user equipment group.

The DCI may include formats 0, 3, 3A and 4 for an uplink and formats 1, 1A, 1B, 1C, 1D, 2, 2A, 2B and 2C for a downlink. The DCI format includes a plurality of different information fields. A type of information fields, the number of information fields, and the number of bits of each information field are varied depending on the DCI format. Also, a size of control information matched with the DCI format is varied depending on the DCI format. A random DCI format may be used for transmission of two or more kinds of control information.

Table 3 illustrates an example of control information transmitted by the DCI format 0. In Table 3, bit size of each information field is only exemplary, and is not limited.

TABLE 3

| Information field | Bit(s) |
|---|---|
| (1) Flag for identification of Format 0/Format 1A | 1 |
| (2) Hopping flag | 1 |
| (3) Resource block allocation and hopping resource allocation | $\lceil \log_2(N_{RB}^{UL}(N_{RB}^{UL} + 1)/2) \rceil$ |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

The flag field is the information field for identification of format 0 and format 1A. In other words, the DCI formats 0 and 1A have the same payload size and are identified from each other by the flag field. The resource block allocation and hopping resource allocation field may have a bit size varied depending on hopping PUSCH or non-hopping PUSCH. The resource block allocation and hopping resource allocation field for non-hopping PUSCH provides $\lceil \log_2(N_{RB}^{UL}(N_{RB}^{UL}+1)/2) \rceil$ bit for resource allocation of the first slot within the uplink subframe. In this case, $N^{UL}_{RB}$ is the number of resource blocks included in the uplink slot and is determined depending on an uplink transmission bandwidth set in the cell. Accordingly, the payload size of the DCI format 0 may be varied depending on the uplink bandwidth. The DCI format 1A includes an information field for PDSCH allocation, and the payload size of the DCI format 1A may be varied depending on the downlink bandwidth. The DCI format 1A provides a reference information bit size for the DCI format 0. Accordingly, if the number of information bits of the DCI format 0 is smaller than the number of information bits of the DCI format 1A, '0' is added to the DCI format 0 until the payload size of the DCI format 0 is the same as that of the DCI format 1A. The added '0' is filled in a padding field of the DCI format.

A transmission scheme according to the transmission mode and information contents of the DCI formats will be described as follows.

Transmission Mode (TM)
Transmission mode 1: transmission from single base station antenna port
Transmission mode 2: transmission diversity
Transmission mode 3: open-loop spatial multiplexing
Transmission mode 4: closed-loop spatial multiplexing
Transmission mode 5: multi-user MIMO
Transmission mode 6: closed-loop rank-1 precoding
Transmission mode 7: single-antenna port (port 5) transmission
Transmission mode 8: dual layer transmission (ports 7 and 8) or single-antenna port (port 7 or 8) transmission
Transmission modes 9 and 10: maximum 8 layer transmission (ports 7 to 14) or single-antenna port (port 7 or 8) transmission
DCI Format
Format 0: resource grant for PUSCH transmission (uplink)
Format 1: resource allocation for single codeword PDSCH transmission (transmission modes 1, 2 and 7)
Format 1A: compact signaling of resource allocation for single codeword PDSCH (all transmission modes)
Format 1B: compact resource allocation for PDSCH (transmission mode 6) based on rank-1 closed-loop precoding
Format 1C: very compact resource allocation for PDSCH (for example, paging/broadcast system information)
Format 1D: compact resource allocation for PDSCH (transmission mode 5) based on multi-user MIMO
Format 2: resource allocation for PDSCH (transmission mode 4) of closed-loop MIMO operation
Format 2A: resource allocation for PDSCH (transmission mode 3) of open-loop MIMO operation
Format 3/3A: power control command having 2-bit/1-bit power control value for PUCCH and PUSCH
Format 4: resource grant for PUSCH transmission (uplink) in a cell set to multi-antenna port transmission mode The transmission mode 10 may be used in a coordinated multi-point (CoMP) system. A CoMP scheme, which may be applied to a downlink, may include a joint transmission (JT) scheme, a coordinated scheduling/beamforming (CS/CB) scheme, and a dynamic cell selection (DCS) scheme.

The joint transmission (JT) scheme means that a downlink signal (for example, PDSCH and PDCCH) is transmitted from a plurality of points (some or all of points (for example, base station) which join CoMP operation) at one time. In other words, data transmitted to a single user equipment may be transmitted from a plurality of transmission points at the same time. According to the joint transmission scheme, quality of a received signal may be improved coherently or non-coherently, and interference on another user equipment may be removed actively. The dynamic cell selection scheme means that a PDSCH is transmitted from one point (of points which join CoMP operation) at one time. In other words, data transmitted to a single user equipment at a specific time are transmitted from one point. Another point within the points which join CoMP operation may not perform data transmission to the corresponding user equipment at the specific time, and the point which transmits data to the corresponding user equipment may be selected dynamically. In the meantime, according to the CS/CB scheme, points which join CoMP operation may cooperatively perform beamforming of data transmission to a single user equipment. In this case, although the data are transmitted from a serving point only, user scheduling/beamforming may be determined by coordination of the points which join the corresponding CoMP operation.

In the meantime, in case of an uplink, coordinated multi-point reception means that a signal is received by coordination of a plurality of points locally spaced apart from one another. A CoMP scheme that may be applied to the uplink may be classified into a joint reception (JR) scheme and a coordinated scheduling/beamforming (CS/CB) scheme. The JR scheme means that a signal transmitted through a PUSCH is received from a plurality of reception points. The CS/CB scheme means that a PUSCH is received from one point only but user scheduling/beamforming is performed.

If the CoMP system is used, the user equipment may be supported with data in common from multi-cell base stations. Also, each base station may improve system throughput by supporting the same radio frequency resource for one or more user equipments at the same time. Also, the base station may perform a space division multiple access (SDMA) method on the basis of channel state information with the user equipment.

The user equipment may be configured semi-statically by upper layer signaling to receive PDSCH data transmission scheduled through the PDCCH in accordance with ten transmission modes. Table 4 illustrates transmission modes signaled by upper layer and DCI formats, which may be configured, when the user equipment detects the PDCCH scrambled with C-RNTI.

TABLE 4

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 or single-antenna port, port 7 or 8 |

The user equipment detects the PDCCH in accordance with each combination defined in Table 4, and receives the PDSCH corresponding to the detected PDCCH. In other words, the user equipment may detect a DCI format from the corresponding search space in accordance with the transmission mode signaled by upper layer and receive data by varying a transmission scheme of the PDSCH.

In case of a transmission mode 8 (TM 8), the DCI format which is detected may be divided into a DCI format 1A and a DCI format 2B. If the DCI detected by the user equipment is the format 1A, the search space may be set to a common search space (CSS) and a UE specific search space (USS) based on cell radio-network temporary identifier (C-RNTI). Moreover, the PDSCH transmission scheme is configured to use port #0 if the number of antenna ports of a physical broadcast channel (PBCH) is one, that is, in case of a single antenna port, and is configured to use a transmit diversity scheme in other cases. If the DCI format detected by the user equipment is 2B, the search space is set to the UE specific search space (USS) based on the C-RNTI. Also, the user equipment may be configured to use a dual layer transmission scheme based on antenna ports #7 and #8 or a single antenna port scheme based on antenna ports #7 and #8.

In case of the user equipment set to a transmission mode 9 (TM 9), the DCI format which is detected may be divided into a DCI format 1A and a DCI format 2C. If the DCI detected by the user equipment is the format 1A, the search space may be set to a common search space (CSS) and a UE specific search space (USS) based on cell radio-network temporary identifier (C-RNTI). If the DCI detected by the user equipment set to the TM 9 has the format DCI format 1A, the PDSCH transmission scheme is configured differently depending on a multimedia broadcast single frequency network (MBSFN) subframe. In case of the MBSFN subframe, the PDSCH transmission scheme is configured to use port #0 when the number of antenna ports of a physical broadcast channel (PBCH) is one, that is, in case of a single antenna port, and is configured to use a transmit diversity scheme in other cases. If case of no MBSFN subframe, the PDSCH transmission scheme is configured to use antenna port #7 as a single antenna port.

If the DCI format detected by the user equipment set to the TM 9 is 2C, the search space is set to a UE specific search space (USS) based on C-RNTI. At this time, the PDSCH transmission scheme may be configured to use maximum eight layers corresponding to antenna ports #7 to #14 or use a single antenna port of antenna port #7 or #8.

In case of the user equipment set to a transmission mode 10 (TM 10), the DCI format which is detected may be divided into a DCI format 1A and a DCI format 2D. If the DCI detected by the user equipment is the format 1A, the same description as that of the transmission mode 9 may be applied to the DCI format 1A. If the DCI format 2D is detected, the same description as that of the DCI format 2C in the transmission mode 9 may be applied to the DCI format 2D.

Table 5 illustrates transmission modes signaled by upper layer, DCI formats, which may be configured, and search spaces, when the user equipment detects the PDCCH scrambled with semi-persistent C-RNTI.

a control region in a frequency domain. The data region includes a PUSCH, and is used to transmit a data signal such as voice. The control region includes a PUCCH, and is used to transmit control information. The PUCCH includes RB pair (for example, m=0, 1, 2, 3) located at both ends of the data region on a frequency axis, and performs hopping on the border of the slots. The control information includes HARQ ACK/NACK, channel quality information (CQI), precoding matrix indicator (PMI), and rank indication (RI).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | DE specific by C-RNTI | Single-antenna port, part 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Transmit diversity |
| Mode 4 | DCI format 1A | Common and UE specific by C-RNTI | Transmit diversity |
|  | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
|  | DCI format 1 | UE specific by C-RNTI | Single-antenna port, port 5 |
| Mode 8 | DCI format 1A | Common and UE specific by C-RNTI | Single-antenna port, port 7 |
|  | DCI format 2B | UE specific by C-RNTI | Single-antenna port, port 7 or 8 |
| Mode 9 | DCI format 1A | Common and UE specific by C-RNTI | Single-antenna port, port 7 |
|  | DCI format 2C | UE specific by C-RNTI | Single-antenna port, port 7 or 8 |
| Mode 10 | DCI format 1A | Common and UE specific by C-RNTI | Single-antenna port, port 7 |
|  | DCI format 2D | UE specific by C-RNTI | Single-antenna port, port 7 or 8 |

Table 6 illustrates DCI formats, which may be configured, and search spaces, when the user equipment detects the PDCCH scrambled with temporary C-RNTI.

TABLE 6

| DCI format | Search Space | Transmission scheme of PDSCH corresponding to PDCCH |
|---|---|---|
| DCI format 1A | Common and UE specific by Temporary C-RNTI | If the number of PBCH antenna port is one, Single-antenna port, port 0 is used, otherwise Transmit diversity |
| DCI format 1 | UE specific by Temporary C-RNTI | If the number of PBCH antenna port is one, Single-antenna port, port 0 is used, otherwise Transmit diversity |

Figure 6:
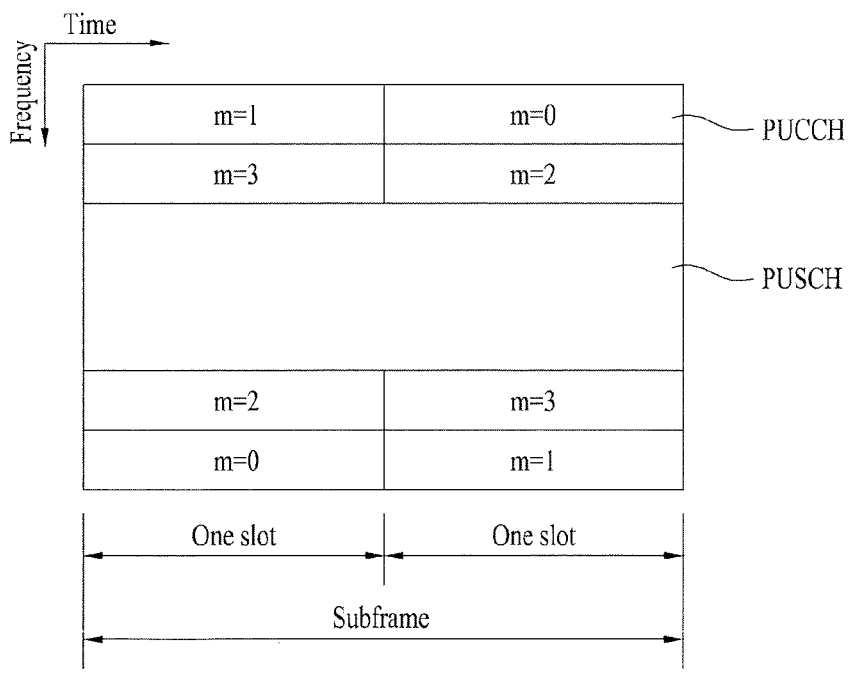
FIG. 6 is a diagram illustrating a structure of an uplink subframe used in an LTE system.

FIG. 6 is a diagram illustrating a structure of an uplink subframe used in an LTE system.

Figure 7:
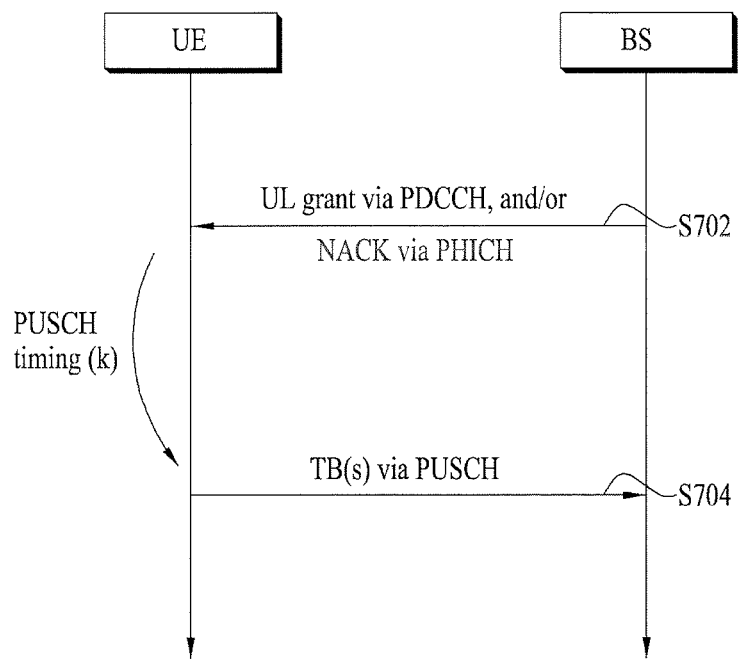
FIG. 7 is a diagram illustrating PHICH/UL grant-PUSCH timing.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. For example, in case of a normal CP, the slot may include seven SC-FDMA symbols. The uplink subframe is divided into a data region and FIG. 7 is a diagram illustrating PHICH/UL grant-PUSCH timing. The PUSCH may be transmitted to correspond to PDCCH (UL grant) and/or PHICH (NACK).

Referring to FIG. 7, the user equipment may receive PDDCH (UL grant) and/or PHICH (NACK) (S702). In this case, NACK corresponds to ACK/NACK response to previous PUSCH transmission. In this case, the user equipment may initialize/retransmit one or a plurality of transport blocks (TBs) through the PUSCH after subframe k through a procedure (for example, TB coding, TB-CW swapping, PUSCH resource allocation, etc.) for PUSCH transmission (S704). In this example, it is assumed that normal HARQ operation is performed, that is, PUSCH is transmitted once. In this case, PHICH/UL grant corresponding to PUSCH transmission exists at the same subframe. However, in case of subframe bundling in which the PUSCH is transmitted through a plurality of subframes several times, PHICH/UL grant corresponding to PUSCH transmission may exist at different subframes.

In more detail, if the PHICH/UL grant is detected at subframe n, the user equipment may transmit the PUSCH at subframe n+k. In case of the FDD system, k has a fixed value (for example, 4). In case of the TDD system, k has different values depending on UL-DL configuration. Table 5 illustrates uplink association index (UAI) (k) for PUSCH transmission in the TDD LTE(-A) system.

TABLE 7

| TDD UL/DL Configuration | \multicolumn{10}{c}{subframe number n} |
|---|---|---|---|---|---|---|---|---|---|---|
|  | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   | 7 | 7 |   |   | 5 |

Figure 8:
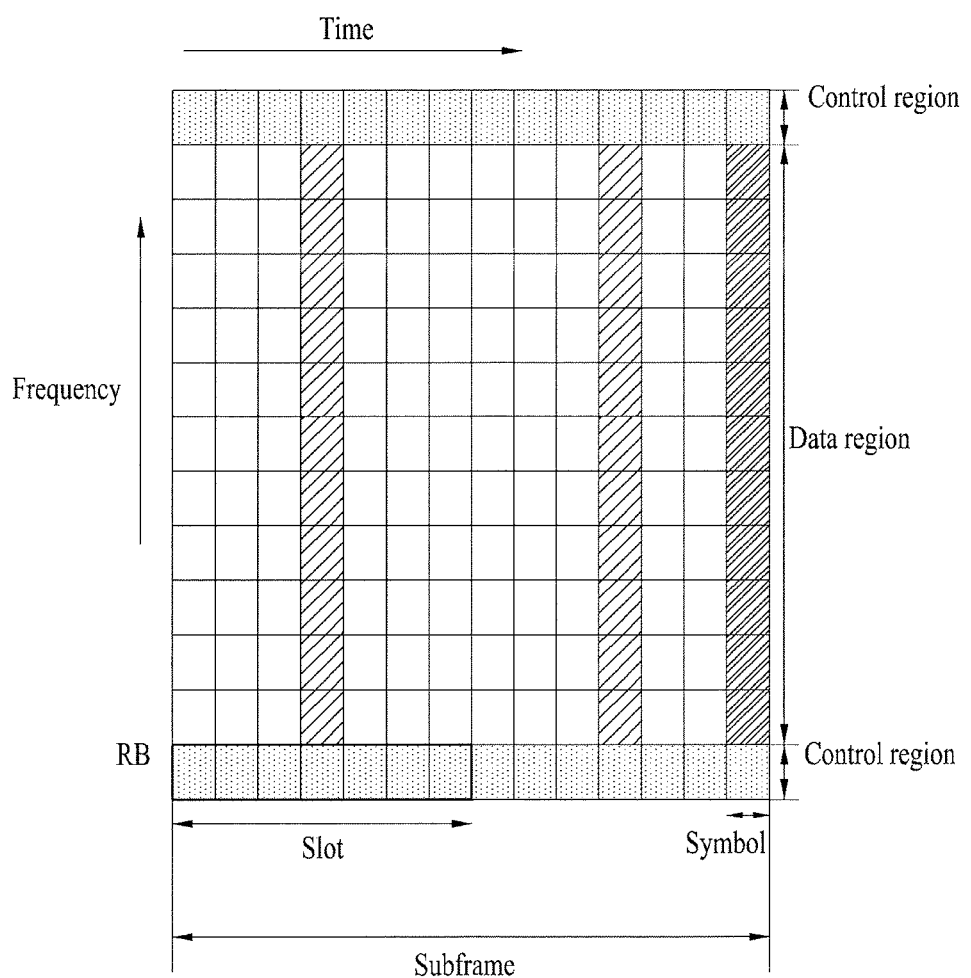
FIG. 8 is a diagram illustrating a reference signal used at an uplink subframe of an LTE system.

FIG. 8 is a diagram illustrating a reference signal used in an uplink subframe of an LTE system.

Referring to FIG. 8, a sounding reference signal (SRS) may be transmitted from the user equipment periodically or non-periodically to estimate a channel for an uplink sub band other than a band to which the PUSCH is transmitted or acquire information of a channel corresponding to a full uplink bandwidth (wide band). If the sounding reference signal is transmitted periodically, the period is determined through upper layer signaling. Non-periodic transmission of the sounding reference signal may be indicated by the base station by using an 'SRS request' field of a PDCCH uplink/downlink DCI format, or may be performed using a triggering message. As illustrated in FIG. 8, a region to which the sounding reference signal may be transmitted within one subframe is a period corresponding to SC-FDMA symbol located at the last on a time axis at one subframe. In case of a TDD special subframe, the SRS may be transmitted through an uplink period (for example, UpPTS). In case of subframe configuration where one symbol is allocated to the uplink period (for example, UpPTS) in accordance with Table 2, the SRS may be transmitted through the last one symbol. In case of subframe configuration where two symbols are allocated to the uplink period (for example, UpPTS) in accordance with Table 2, the SRS may be transmitted through the last one symbol or two symbols. Sounding reference signals of several user equipments, which are transmitted to the last SC-FDMA symbol of the same subframe, may be identified from one another in accordance with frequency location. Unlike the PUSCH, discrete Fourier transform (DFT) operation for transform to SC-FDMA is performed for the sounding reference signal, and the sounding reference signal is transmitted without using a precoding matrix used for the PUSCH.

Moreover, a region to which a demodulation reference signal (DMRS) is transmitted within one subframe corresponds to a period of SC-FDMA symbol located in the middle of each slot on a time axis. Likewise, the demodulation reference signal DMRS is transmitted through a data transmission bandwidth on the frequency. For example, the demodulation reference signal DMRS is transmitted through the fourth SC-FDMA symbol and the eleventh SC-FDMA symbol at the subframe to which a normal cyclic prefix is applied.

The demodulation reference signal DMRS may be combined with PUSCH or PUCCH transmission. The sounding reference signal is the reference signal transmitted from the user equipment to the base station to perform uplink scheduling. The base station estimates an uplink channel through the received reference sounding reference signal and uses the estimated uplink channel for uplink scheduling. The sounding reference signal is not combined with PUSCH or PUCCH transmission. The same type basic sequence may be used for the demodulation reference signal and the sounding reference signal. Meanwhile, precoding applied to the demodulation reference signal in uplink multi-antenna transmission may be the same as precoding applied to the PUSCH.

Figure 9:
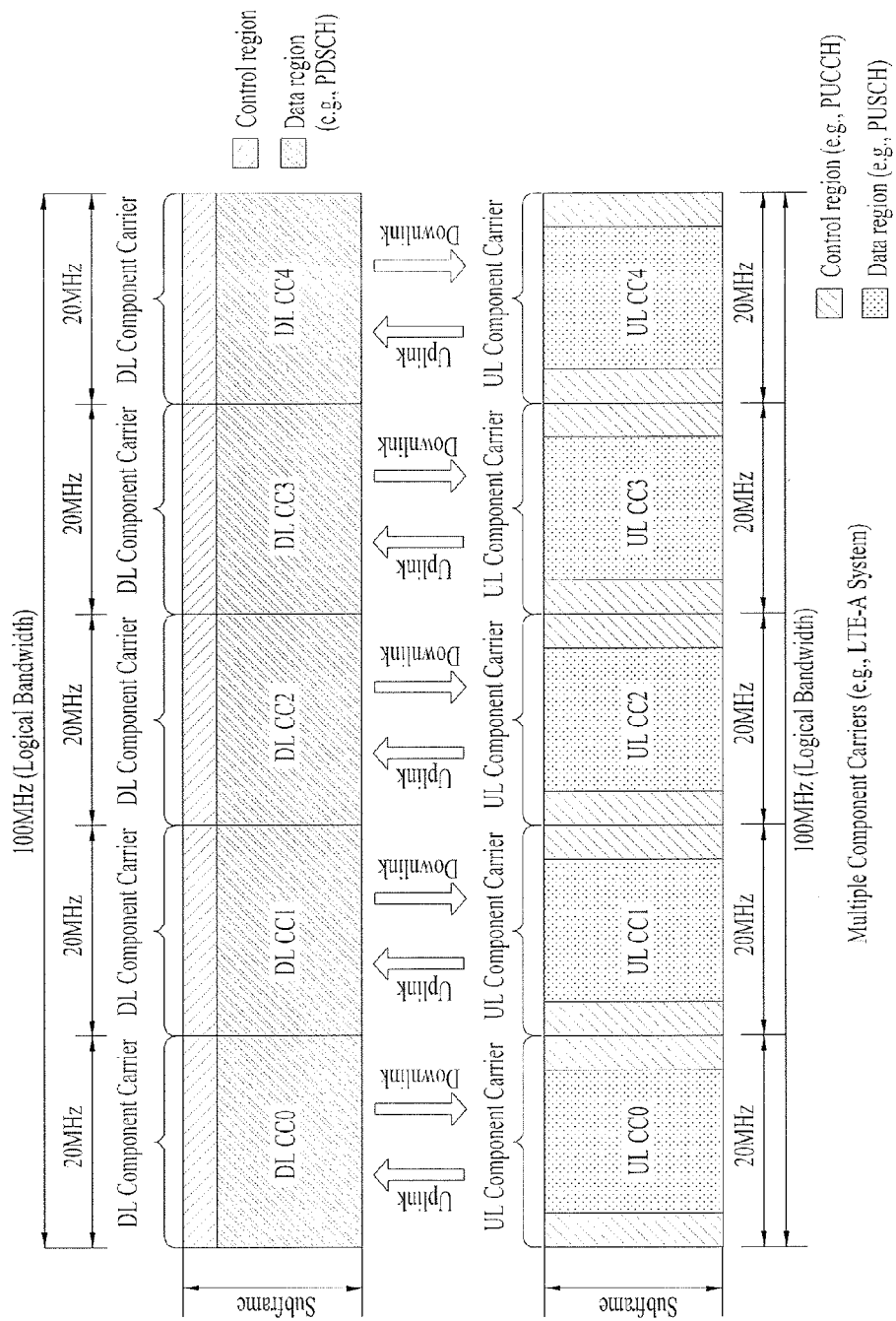
FIG. 9 is a diagram illustrating a carrier aggregation (CA) communication system.

FIG. 9 is a diagram illustrating a carrier aggregation (CA) communication system.

Referring to FIG. 9, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs. The PCC may be used to allow the user equipment to perform an initial connection establishment procedure or a connection re-establishment procedure. The PCC may refer to a cell indicated during a handover procedure. In case of uplink transmission, the uplink control channel may be transmitted to the base station through the PCC only. Also, in case of downlink transmission, if cross-carrier scheduling is set, the control channel for downlink scheduling may be transmitted to the user equipment through the PCC. The SCC may be configured after RRC connection establishment is performed, and may be used to provide additional radio resource. For example, if cross-carrier scheduling (or cross-CC scheduling) is used, the PDCCH for downlink allocation is transmitted to DL CC#0, and the corresponding PDSCH may be transmitted to DL CC#2. The terminology "component carrier" may be replaced with an equivalent another terminology (for example, carrier, cell, etc.).

For cross-carrier scheduling, a carrier indicator field (CIF) is used. Configuration of the presence or not of the CIF within the PDCCH may be enabled by upper layer signaling (for example, RRC signaling) semi-statically and user equipment-specifically (or user equipment group-specifically). The base line of PDCCH transmission will be summed up as follows.

CIF disabled: the PDCCH on the DL CC allocates PDSCH resource on the same DL CC or PUSCH resource on one linked UL CC.
  No CIF
CIF enabled: the PDCCH on the DL CC may allocate PDSCH or PUSCH resource on one DL/UL CC of a plurality of aggregated DL/UL CCs by using the CIF.
  LTE DCI format extended to have CIF
    CIF (if configured) is a fixed x-bit field (for example, x=3)
    CIF (if configured) location is fixed regardless of DCI format size.

If the CIF exists, the base station may allocate a PDCCH monitoring DL CC (set) to reduce complexity of blind decoding (BD) in view of the user equipment. For PDSCH/PUSCH scheduling, the user equipment may perform detection/decoding of the PDCCH on the corresponding DL CC only. Also, the base station may transmit the PDCCH through monitoring DL CC (set) only. The monitoring DL CC set may be set user equipment-specifically, user equipment group-specifically or cell-specifically.

Figure 10:
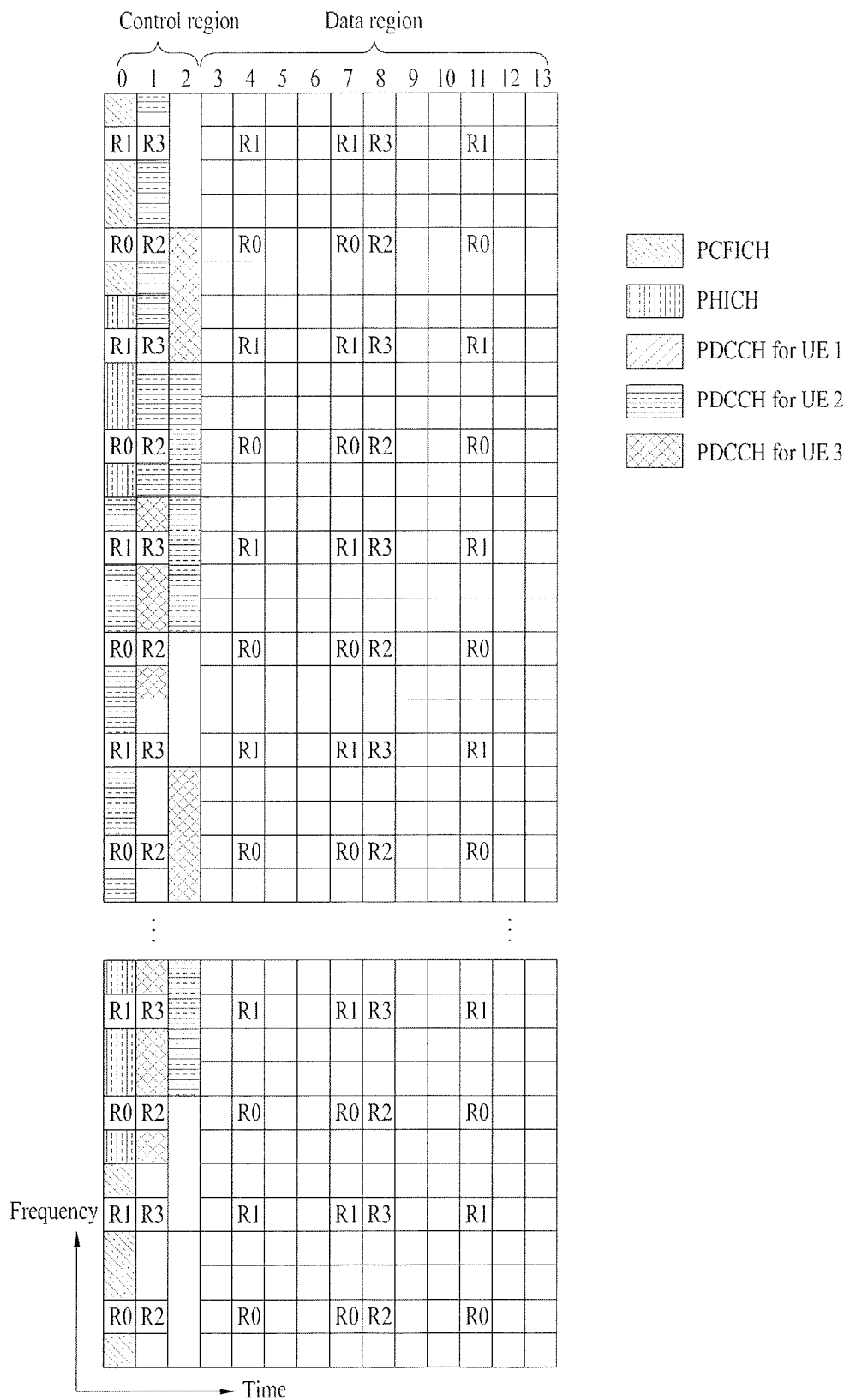
FIG. 10 is a diagram illustrating a control channel allocated to a downlink subframe.

FIG. 10 is a diagram illustrating a control channel allocated to a downlink subframe.

Referring to FIG. 10, the PCFICH is transmitted at the first OFDM symbol of the subframe, and carries information about the number of OFDM symbols used for transmission of the control channel within the subframe. The PCFICH includes four REGs, each of which is distributed equally within the control region on the basis of cell ID. The PCFICH indicates a value of 1 to 3 (or 2 to 4), and is modulated by QPSK (Quadrature Phase Shift Keying). The PHICH carries HARQ ACK/NACK (acknowledgement/negative-acknowledgement) signal in response to uplink transmission. The PHICH is allocated on the REG remaining except for CRS and PCFICH (first OFDM symbol) from one or more OFDM symbols set by PHICH duration. The PHICH is allocated to three REGs distributed in the maximum range on the frequency domain. The PDCCH is allocated within first n OFDM symbols (hereinafter, control region) of the subframe, wherein n is an integer greater than 1 and is indicated by the PCFICH.

In FIG. 10, R1 to R4 represent CRS (cell-specific reference signal or cell-common reference signal) for antenna ports 0 to 3. When a packet (or signal) is transmitted in the wireless communication system, signal distortion may occur during transmission of the packet because the packet is transmitted through a radio channel. In order to normally receive the distorted signal, a receiver should discover information of the channel and compensate distortion of the signal as much as the channel information. In order to discover the channel information, it is required to transmit the signal known by both a transmitter and the receiver and discover the channel information using a distortion level of the signal when the signal is transmitted through the channel. In this case, the signal known by both the transmitter and the receiver will be referred to as a pilot signal or a reference signal. In case that the transmitter or the receiver of the wireless communication system transmits and receives by using multiple antennas, a separate reference signal should be provided per transmitting antenna, whereby a channel state between each transmitting antenna and each receiving antenna should be known to receive a normal signal.

In the wireless communication system, the reference signal (RS) may include a reference signal used for acquisition of channel information and a reference signal used for data demodulation in accordance with its purpose. Since the RS for acquisition of channel information is intended for acquisition of channel information on the downlink through the user equipment, the RS may be transmitted through a wideband, and may be received and measured even by a user equipment that does not receive downlink data at a special subframe. Also, this reference signal for acquisition of channel information may be used even for measurement during handover. The RS for data demodulation is transmitted from the base station together with a corresponding resource when the base station transmits downlink data. In this case, the user equipment may perform channel measurement by receiving the corresponding reference signal, and may demodulate the data. This reference signal for data demodulation may be transmitted to a region to which data are transmitted.

The release-8 LTE system defines two types of downlink reference signals for unicast service. That is, the downlink reference signals are a common reference signal (CRS) for both acquisition of channel state information and measurement of handover and a user equipment specific reference signal (UE-specific RS) which is a dedicated RS (DRS) for data demodulation. In the release-8 LTE system, the user equipment specific RS is used for data demodulation only, and the CRS may be used for both acquisition of channel information and data demodulation. The CRS is a cell-specific RS and is transmitted to a wideband per subframe.

In this specification, the CRS may be referred to as the cell-specific RS. The CRS for maximum four antenna ports may be transmitted in accordance with the number of transmitting antennas of the base station. For example, if the number of transmitting antennas of the base station is 2, CRS for antenna ports 0 and 1 may be transmitted. If the number of transmitting antennas of the base station is 4, CRS for antenna ports 0 to 3 may be transmitted respectively. The CRS is transmitted to a full band per subframe, and is fixed at a given pattern within the subframe. The CRS is used for channel measurement and downlink signal demodulation.

The LTE-A system which is an evolved version of the LTE system may support maximum eight transmitting antennas for downlink transmission of the base station. To this end, reference signals for maximum eight transmitting antennas are also supported. In the LTE system, since downlink reference signals are defined for maximum four antenna ports, if the base station includes minimum four downlink transmitting antennas to maximum eight downlink transmitting antennas in the LTE-A system, reference signals for these antenna ports are additionally defined and designed. The reference signals for maximum eight transmitting antenna ports may be considered for two types of reference signals, i.e., the reference signal for channel measurement and the reference signal for data demodulation as described above.

Figure 11:
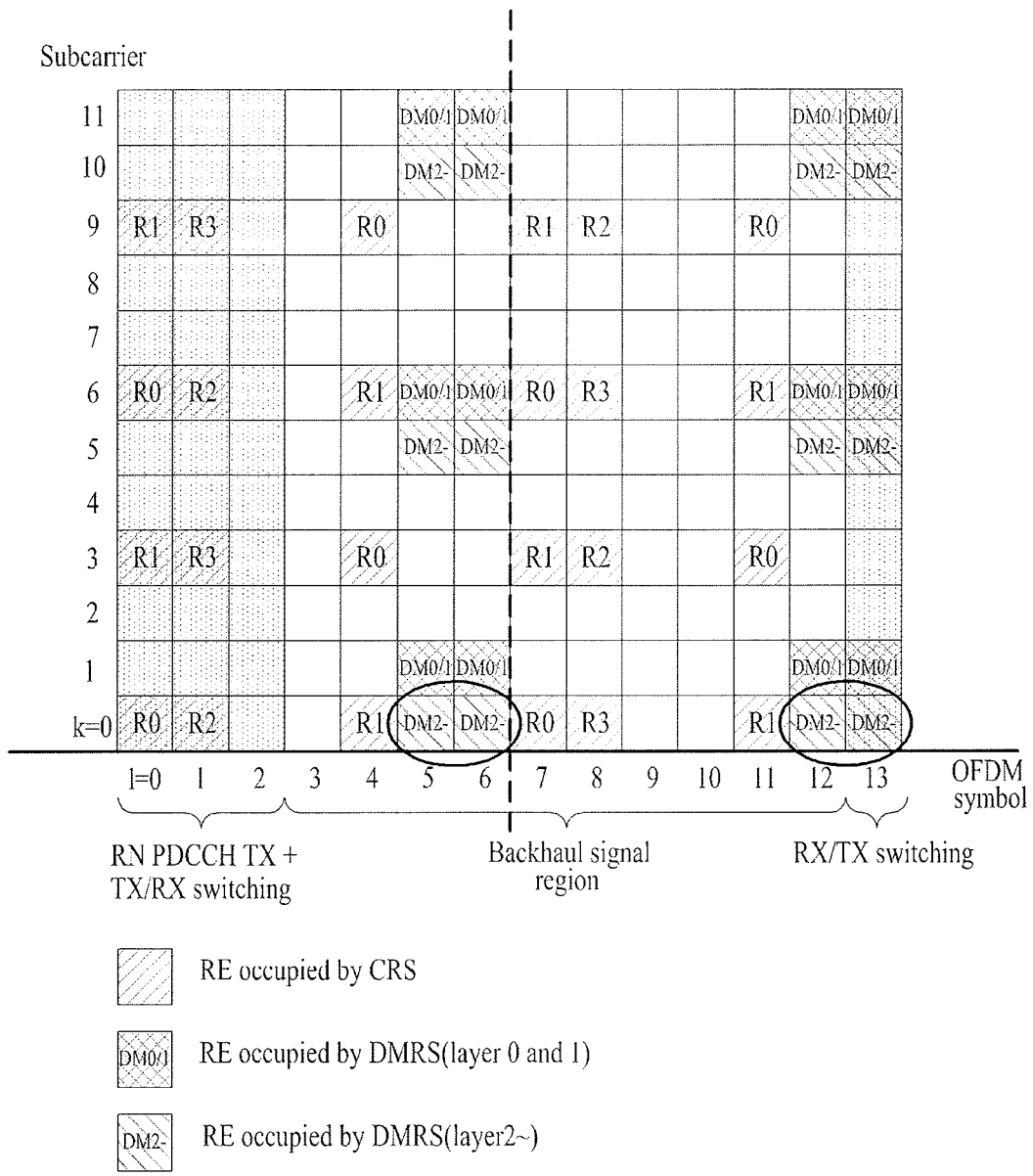
FIG. 11 is a diagram illustrating a DM-RS (DeModulation Reference Signal) structure added to an LTE-A system.

FIG. 11 is a diagram illustrating a DM-RS (DeModulation Reference Signal) structure added to an LTE-A system. The DM-RS is the user equipment-specific reference signal used to demodulate a signal of each layer if the signal is transmitted using multiple antennas. The DM-RS is used for demodulation of the PDSCH. Since the LTE-A system considers maximum eight transmitting antennas, maximum eight layers and each DM-RS for the maximum eight layers will be required.

Referring to FIG. 11, the DM-RS is multiplexed with the same RE shared by two or more layers in accordance with a code division multiplexing (CDM) scheme. In more detail, the DM-RS for each layer are spread using a spreading code (for example, Walsh code, orthogonal code such as DFT code) and then multiplexed on the same RE. For example, the DM-RS for layers 0 and 1 share the same RE, and are spread on two REs of OFDM symbols 12 and 13 at a subcarrier 1 (k=1) by using an orthogonal code. In other words, at each slot, the DM-RS for the layers 0 and 1 are spread along a time axis by using a spreading factor (SF)=2 code and then multiplexed with the same RE. For example, the DM-RS for the layer 0 may be spread using [+1 +1], and the DM-RS for the layer 1 may be spread using [+1 −1]. Similarly, the DM-RS for layers 2 and 3 are spread on the same RE by using different orthogonal codes. The DM-RS for layers 4, 5, 6 and 7 are spread on the RE reserved by DM-RS 0 and 1 and DM-RS 2 and 3 by using codes orthogonal to the existing layers 0, 1, 2 and 3. SF=2 code is used for the DM-RS until four layers are used, and SF=4 code is used for the DM-RS if five or more layers are used. In the LTE-A system, the antenna port for the DM-RS is {7, 8, . . . , n+6} (n is the number of layers).

Figure 12:
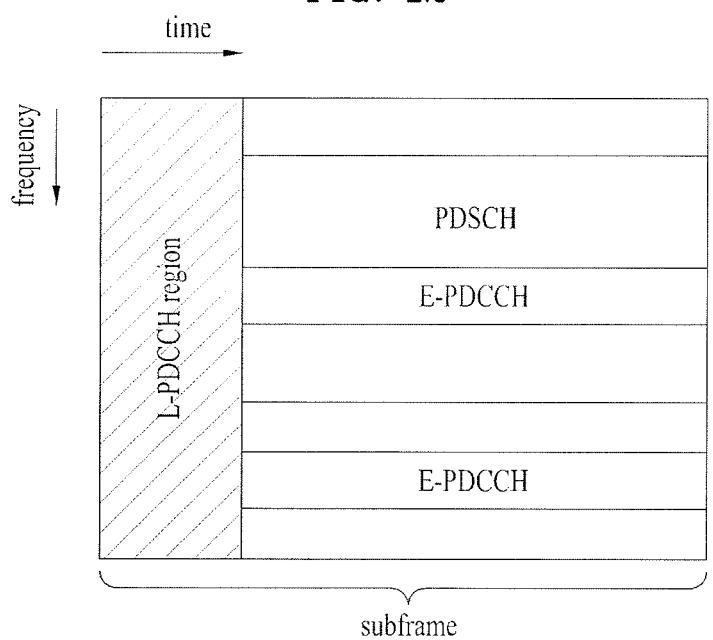
FIG. 12 is a diagram illustrating an example of allocating a downlink physical channel to a subframe.

FIG. 12 is a diagram illustrating an example of allocating a downlink physical channel to a subframe.

Referring to FIG. 12, a PDCCH (for convenience, legacy PDCCH) according to the LTE(-A) system of the related art may be allocated to the control region (see FIGS. 5 and 10) of the subframe. In FIG. 12, an L-PDCCH region means a region to which the legacy PDCCH may be allocated. The L-PDCCH region may mean the control region, a control channel resource region (that is, CCE resource) to which the PDCCH may actually be allocated within the control region, or a PDCCH search space. Meanwhile, the PDCCH may additionally be allocated to the data region (for example, resource region for PDSCH, see FIGS. 5 and 10). The PDCCH allocated to the data region will be referred to as E-PDCCH. As shown, the control channel resource is additionally allocated through the E-PDCCH, scheduling restriction due to a limited control channel resource of the L-PDCCH region may be reduced.

Specifically, the E-PDCCH may be detected/demodulated based on the DM-RS. The E-PDCCH may be transmitted to a PRB pair on the time axis. In more detail, a search space (SS) for E-PDCCH detection may include one or a plurality of (for example, 2) E-PDCCH candidate sets. Each E-PDCCH set may reserve a plurality of (for example, 2, 4, 8) PRB pairs. Enhanced CCE (E-CCE) constituting the E-PDCCH set may be mapped in a localized or distributed type (depending on whether one E-CCE is spared in the plurality of PRB pairs). Also, if E-PDCCH based scheduling is configured, a subframe at which E-PDCCH transmission/detection will be performed may be designated. The E-PDCCH may be configured in the USS only. The user equipment may try DCI detection for L-PDCCH CSS and E-PDCCH USS only at a subframe (hereinafter, E-PDCCH subframe) at which E-PDCCH transmission/detection is configured, and may try DCI detection for L-PDCCH CSS and L-PDCCH USS at a subframe (non-E-PDCCH subframe) at which E-PDCCH transmission/detection is not configured.

In case of the E-PDCCH, the USS may include K number of E-PDCCH set(s) (per CC/cell) in view of one user equipment. K may be greater than or the same as 1, and may be smaller than or the same as a specific limit (for example, 2). Also, each E-PDCCH set may include N number of PRBs (which belong to the PDSCH region). In this case, a value of N and PRB resource/index constituting the value of N may be allocated independently (that is, set-specifically) per E-PDCCH set. As a result, the number and indexes of E-CCE resources constituting each E-PDCCH set may be configured set-specifically (and at the same time UE-specifically). As start PUCCH resource/index is independently configured per E-PDCCH set, PUCCH resource/index linked to each E-CCE resource/index may be allocated set-specifically (and at the same time UE-specifically). In this case, E-CCE may mean a basic control channel unit of E-PDCCH that includes a plurality of REs (belonging to PRB within the PDSCH region). The E-CCE may have different structures depending on E-PDCCH transmission format. For example, the E-CCE for localized transmission may be configured using REs belonging to the same PRB pair. On the other hand, the E-CCE for distributed transmission may be configured using REs extracted from a plurality of PRB pairs. Meanwhile, in case of localized E-CCE, antenna port (AP) may be used per E-CCE resource/index to allow each user to perform optimized beamforming. On the other hand, in case of distributed E-CCE, the same antenna port set may be used repeatedly by different E-CCEs such that a plurality of users may use the antenna port in common.

In the same manner as the L-PDCCH, the E-PDCCH carries the DCI. For example, the E-PDCCH may carry downlink scheduling information and uplink scheduling information. The E-PDCCH/PDSCH procedure and the E-PDCCH/PUSCH procedure are the same as/similar to those described with reference to the steps S107 and S108 of FIG. 1. In other words, the user equipment may receive the E-PDCCH and receive data/control information through the PDSCH corresponding to the E-PDCCH. Also, the user equipment may receive the E-PDCCH and transmit data/control information through the PUSCH corresponding to the E-PDCCH. Meanwhile, the conventional LTE system adopts a scheme that previously reserves a PDCCH candidate region (hereinafter, PDCCH search space) within the control region and transmits a PDCCH of a specific user equipment to some region of the reserved PDCCH candidate region. Accordingly, the user equipment may obtain its PDCCH within the PDCCH search space through blind decoding. Similarly, the E-PDCCH may be transmitted to some or all of the previously reserved resource.

In the meantime, one of the important considerations in the LTE-A system is backward compatibility. In other words, the LTE user equipment should be compatible even in the LTE-A system. In view of transmission of the reference signal (RS), the reference signals for maximum eight transmitting antenna ports may additionally be defined in the time-frequency domain where the CRS defined in the LTE system is transmitted to a full band per subframe. However, if the reference signal pattern for the maximum eight transmitting antennas is added to the full band per subframe in the LTE-A system in the same manner as the CRS of the conventional LTE system, RS overhead may be too increased. Accordingly, the reference signal newly designed in the LTE-A system may be divided into two types, that is, a channel state information-reference signal (CSI-RS) (or channel state indication-RS) for channel measurement to select a modulation and coding scheme (MCS), a precoding matrix index (PMI), etc., and a data demodulation-reference signal (DM-RS) for data demodulation. The CSI-RS is characterized in that it is designed for channel measurement unlike the existing CRS used for data demodulation simultaneously with channel measurement and measurement of handover. Also, the CSI-RS may be used for measurement of handover, etc. Since the CSI-RS is transmitted to obtain channel state information, the CSI-RS may not be transmitted per subframe unlike the CRS. In order to reduce overhead of the CSI-RS, the CSI-RS is intermittently transmitted on the time axis, and a dedicated DM-RS is transmitted to a scheduled user equipment on the corresponding time-frequency domain to perform data demodulation. In other words, the DM-RS of a specific user equipment may be transmitted to only a region where the corresponding user equipment is scheduled, that is, the time-frequency domain where data may be received. Accordingly, the DM-RS may be referred to as UE-specific RS. In this specification, the LTE system may refer to system based on 3GPP 36 series TS (Technical Specification) release-8, 9, 10.

As described above, the CRS (Common Reference Signal or Cell-specific Reference Signal) and a control channel such as PCFICH/PDCCH/PHICH may be transmitted through all the downlink subframes for a random carrier except for a downlink subframe set for a specific purpose (for example, MBSFN (Multicast Broadcast Single Frequency Network)) in the 3GPP LTE(-A) system (for example, Release-8, 9, 10). The CRS may be allocated to all the OFDM symbols of the subframe, and the control channel such as PCFICH/PDCCH/PHICH may be allocated to some of the OFDM symbols at the front on the time axis of the subframe. Such CRS and control channels may assure backward compatibility for access of the existing user equipment and service offer. However, it may be difficult to improve inter-cell interference problem while maintaining backward compatibility with the existing LTE system, improve carrier extendability, or provide advanced features (for example, 8Tx MIMO). Accordingly, in next release system, the introduction of a new type carrier may be considered, which does not support all or some of backward compatible signals/channels as described above to provide more advanced features than those of the existing LTE system. In this specification, a carrier type which is added as compared with the existing LTE system will be defined as a new carrier type (NCT). Also, the NCT carrier may not be compatible with the existing LTE(-A) system. A carrier type which is compatible with the existing LTE(-A) system will be defined as a legacy carrier type (LCT).

In view of transmission of the reference signal, the LCT carrier may be characterized in that the reference signal (for example, Cell-specific Reference Signal or Cell-common Reference Signal, CRS) is transmitted to a full-band of some OFDM symbols of at least a front side of all the subframes. The NCT carrier may be characterized in that the reference signal (for example, CRS) is transmitted only at some subframe and/or some frequency resources as described below. Although the reference signal transmitted through the NCT carrier is described as the CRS in comparison with the LCT carrier, the CRS actually transmitted through the NCT carrier may be the RS having the same configuration as that of the CRS of the LCT carrier, the RS having a configuration similar to that of the CRS of the LCT carrier, or the RS newly defined for the NCT carrier. Also, in case of the NCT carrier, the CRS may be used for time/frequency synchronization. In this case, the CRS transmitted through the NCT may be referred to as a tracking RS.

Accordingly, in case of the NCT carrier, fixed CRS transmission which basically has high resource allocation density may be omitted or reduced drastically. In other words, downlink data reception and channel state measurement based on the CRS may not be performed or may be performed within the minimum range for additional purpose. Instead, downlink data may be received on the basis of the DM-RS transmitted by being precoded UE-specifically through the NCT carrier, and the channel state may be measured on the basis of CSI-RS which is configurable with relatively low resource allocation density. This may improve downlink reception throughput and minimize RS overhead, thereby enabling efficient use of downlink resources. Accordingly, it may be considered to perform downlink data scheduling through the NCT carrier by operating only the transmission mode (for example, TM 8, TM 9 or TM 10) based on the DM-RS among the aforementioned downlink transmission modes (TM). In this case, the downlink transmission mode at the user equipment with the NCT carrier may be set to the DM-RS based transmission mode such as TM 8, TM 9 and TM 10.

In the meantime, synchronization/tracking and various measurements may be required for the NCT. In this case, for synchronization, tracking, measurement, or their combination for the NCT carrier, a method for transmitting a primary synchronization signal (PSS) and/or a secondary synchronization signal (SSS) may be considered, wherein the PSS or the SSS has the same structure as that of the release 8/9/10 LTE system or different structure from that of the release 8/9/10 LTE system. For example, the PSS and/or the SSS transmitted on the NCT carrier may be different from those of the release 8/9/10 LTE system in a relative order between synchronization signals (SS) and an OFDM symbol location to which the synchronization signal is transmitted. Also, a method for partially transmitting a CRS (Common RS) for synchronization, tracking, measurement, or their combination for the NCT carrier on a time and/or frequency domain may be considered. For example, the CRS in the LCT carrier may be transmitted for synchronization, tracking and demodulation to a full band per subframe, whereas the CRS in the NCT carrier may be transmitted for tracking at a constant subframe period. In this way, if the CRS on the NCT carrier is configured to be used for synchronization/tracking, the CRS may not be used for control channel and/or data modulation.

If the CRS in the NCT carrier is partially transmitted, the CRS may be transmitted through a specific antenna port. For example, the CRS may partially be transmitted on the time at a specific period for k number (for example, k=1) of subframe intervals. For example, the CRS may be transmitted at the subframe number 0 and the subframe number 5 of every radio frame. For another example, the CRS may partially be transmitted on the frequency from a region corresponding to specific n (for example, n=6) RBs (or RB pair). For still another example, although the CRS may be transmitted per subframe of a specific period on the time, the CRS may be transmitted to the full band on the frequency.

In the meantime, accessibility for the UE through the NCT carrier may not be provided. For example, the NCT carrier may not be stand-alone, and may be operated/managed as secondary component carrier/secondary serving cell (SCC/Scell) subjected to carrier aggregation (CA) through upper layer signaling (for example, RRC signaling) for the UE that performs access through the LCT carrier and establishes connection. For this reason, the NCT carrier may be considered as UE-common SCC/Scell unlike the SCC/Scell subjected to carrier aggregation (CA) UE-specifically between the existing LCT carriers. Accordingly, the NCT carrier does not allow access/aggregation for the legacy UE (for example, UE compatible with the release 8/9/10 LTE system), whereas the NCT carrier does not allow access but allows aggregation for UE (hereinafter, advanced UE) that supports the NCT carrier. In other words, the NCT carrier may be considered as UE common SCC/Scell that may additionally be allocated to the advanced UE. Accordingly, PUCCH transmission may not be defined through UL SF of the NCT carrier. For example, in case of the FDD system, PUCCH transmission may not be performed through UL carrier linked to DL NCT carrier. Also, for example, in case of the TDD system, PUCCH transmission may not be performed through UL SF on the NCT carrier.

Also, in case of the downlink of the NCT carrier, transmission of a UE-common signal such as PSS/SSS, CRS, and CSI-RS may be required partially but unavoidably. On the other hand, in case of the uplink of the NCT carrier, degree of freedom of configuration for uplink channel/signal transmission related parameters may be high in view of the base station, whereby degree of freedom for uplink resource management/scheduling that may be obtained may be high. For example, the uplink of the NCT carrier may include UL carrier linked to DL NCT carrier in case of the FDD system, and UL subframe period at the NCT carrier and the uplink period (for example, UpPTS) of the special subframe in case of the TDD system.

The channel/signal that may be transmitted through the uplink of the NCT carrier may include PUSCH, PRACH, and periodic/aperiodic SRS. PUSCH transmission may be scheduled dynamically through UL grant (for example, PDCCH). PRACH transmission at the SCC/Scell may be triggered dynamically from the base station through PDCCH order. Aperiodic SRS transmission may also be triggered dynamically through DL/UL grant (for example, PDCCH). On the other hand, the periodic SRS may be transmitted periodically in accordance with a parameter configured semi-statically through RRC signaling. In case of the periodic SRS, the number of UEs that are allocated with one NCT carrier through the SCC/Scell may relatively be smaller than the number of UEs that access one LCT carrier or aggregate the LCT carriers. Accordingly, in case of the NCT carrier, the base station may easily manage/predict periodic SRS transmission.

Considering the features of the NCT carrier as described above, an efficient uplink data transmission method will be suggested. In more detail, a method for efficiently configuring an SC-FDMA symbol period to which uplink data may be transmitted will be suggested. A target that may be considered as additional uplink transmission period in the NCT carrier may be 1) the last symbol belonging to a bandwidth (for example, cell-specific SRS bandwidth) where random SRS transmission may be performed at UL subframe (for example, cell-specific SRS subframe or cell-specific SRS timing) at which random SRS transmission may be performed, or 2) uplink period (for example, UpPTS) (all or some) within the special subframe in the NCT carrier based on the TDD regardless of the cell-specific SRS subframe/bandwidth. In the present invention, the PDCCH may refer to the EPDCCH transmitted through the downlink data region as well as the conventional PDCCH transmitted to the front of the subframe. A detailed method for each case will be described as follows.

Method 1: Use of Last Symbol at Cell-Specific SRS Subframe/Bandwidth

As described above, in case of the subframe configured to transmit the SRS (for example, cell-specific SRS), the SRS may be transmitted through a full band of the system at the last symbol of the subframe. Also, resource allocation for uplink data transmission may be performed at the subframe configured to transmit the SRS. In this case, a resource allocation region for uplink data transmission may be overlapped with the SRS transmission region at some frequency bandwidth of the last symbol. For example, uplink data transmission region may be overlapped with cell-specific SRS transmission region at the last symbol of SRS transmission subframe. In this case, the base station may determine whether to include or exclude the last symbol of the subframe at the overlapped region in or from the uplink data transmission region. If the last symbol of the subframe at the overlapped region is determined to be included in the uplink data transmission region, the user equipment may transmit uplink data to the region including the last symbol without rate matching. By contrast, if the last symbol of the subframe at the overlapped region is determined to be excluded from the uplink data transmission region, the user equipment may transmit uplink data to the region excluding the last symbol through rate matching.

At the bandwidth where the uplink data transmission region is overlapped with the cell-specific SRS transmission region, whether the last symbol of the subframe will be included in or excluded from the uplink data region may be configured semi-statically through upper layer signaling (for example, RRC signaling) or dynamically through UL grant (for example, PDCCH) for scheduling the uplink subframe. If configuration as to whether the last symbol of the subframe will be included in or excluded from the uplink data region is made through UL grant (for example, PDCCH), an indicator indicating whether the last symbol is included in or excluded from the uplink data transmission region may be signaled explicitly. Alternatively, whether the last symbol is included in or excluded from the uplink data transmission region may be indicated implicitly in accordance with a specific field or combination of fields within the UL grant (for example, PDCCH). For example, if implicit indication is made as to whether the last symbol is included in or excluded from the uplink data transmission region, a DMRS cyclic shift field within the UL grant (for example, PDCCH) may be used.

FIG. 13 is a diagram illustrating an example of configuration as to whether uplink data or SRS will be transmitted at the last symbol if the uplink data transmission region is overlapped with the SRS transmission region. In the example of FIG. 13, the cell-specific SRS may be configured to be transmitted through a full band at the last symbol of a special subframe, and resource allocation (for example, PUSCH allocation) for uplink data transmission may be performed at the same special subframe. In this case, a region 1210 where the uplink data transmission region is overlapped with the SRS transmission region may occur. Although a resource for uplink data transmission is allocated to one RB in FIG. 12, the resource may be allocated to a plurality of RBs.

Referring to FIG. 13(a), uplink data (for example, PUSCH) may be transmitted at the last symbol period of the special subframe through upper layer signaling (for example, RRC signaling) or UL grant (for example, PDCCH). In this case, at the overlapped RB region 1210, the user equipment may transmit uplink data without transmitting the SRS. If the plurality of RBs are allocated for uplink data transmission, the user equipment may transmit the uplink data at the overlapped RB region 1210.

Referring to FIG. 13(b), cell-specific SRS transmission may be configured to be performed at the last symbol of the special subframe through upper layer signaling (for example, RRC signaling) or UL grant (for example, PDCCH). In this case, at the overlapped RB region 1210, the user equipment may transmit the SRS without transmitting the uplink data. Likewise, if the plurality of RBs are allocated for uplink data transmission, the user equipment may transmit the SRS at the overlapped RB region 1210. Rate matching may be performed such that the uplink data may be transmitted through the other resource allocation region except for the resource region corresponding to the last symbol.

As a modification (method 1-1) of the method 1, if it is configured or indicated to include the region 1210 where the uplink data transmission region is overlapped with the cell-specific SRS transmission region at the last symbol of the subframe in the uplink data transmission region, a method for transmitting a DMRS at the last symbol region additionally obtained for uplink data transmission may be considered. In this case, as additional DMRS is transmitted, uplink data detection/reception throughput at the base station may be improved. Whether the uplink data or the DMRS will be transmitted at the last symbol region additionally obtained may be configured through upper layer signaling (for example, RRC signaling), or may be indicated explicitly or implicitly through UL grant (for example, PDCCH) for scheduling the uplink subframe. This method may be applied regardless of the fact whether the uplink data transmission region is overlapped with the cell-specific SRS transmission region. As a result, whether the existing method will be applied to random uplink data transmission or DMRS will be transmitted to the last symbol region and data to which rate matching is applied will be transmitted to the other resource region except for the last symbol region may be configured/indicated.

Method 2: Use of Uplink Period of TDD Special Subframe

In TDD based NCT carrier, uplink data may be scheduled to be transmitted through UL subframe (U) existing next to a special subframe (S). In this case, all or some of the uplink period (for example, UpPTS) within the corresponding special subframe may be included in a transmission region for the scheduled uplink data. In this case, the user equipment may transmit one scheduled uplink data at the scheduled UL subframe and the special (S) subframe just prior to the scheduled UL subframe.

Specifically, if UL subframe just behind the special (S) subframe is scheduled, the user equipment may be configured to transmit uplink data at the special (S) subframe and the UL subframe without separate signaling. Alternatively, the user equipment may selectively be configured through separate signaling as to whether to transmit uplink data at both the special (S) subframe and the UL subframe or transmit uplink data at the UL subframe only. If the user equipment is selectively configured through separate signaling, the base station may configure the scheduled uplink data transmission period (S+U or U) at the corresponding UL subframe semi-statically through upper layer signaling (for example, RRC signaling). Alternatively, the base station may explicitly signal an indicator for identifying the UL data transmission period (S+U or U), within UL grant (for example, PDCCH) for scheduling the corresponding UL subframe. Alternatively, the base station may implicitly indicate to differently use the UL data transmission period in accordance with a specific field (for example, DMRS cyclic shift field) or combination of fields within the corresponding UL grant (for example, PDCCH).

Figure 14:
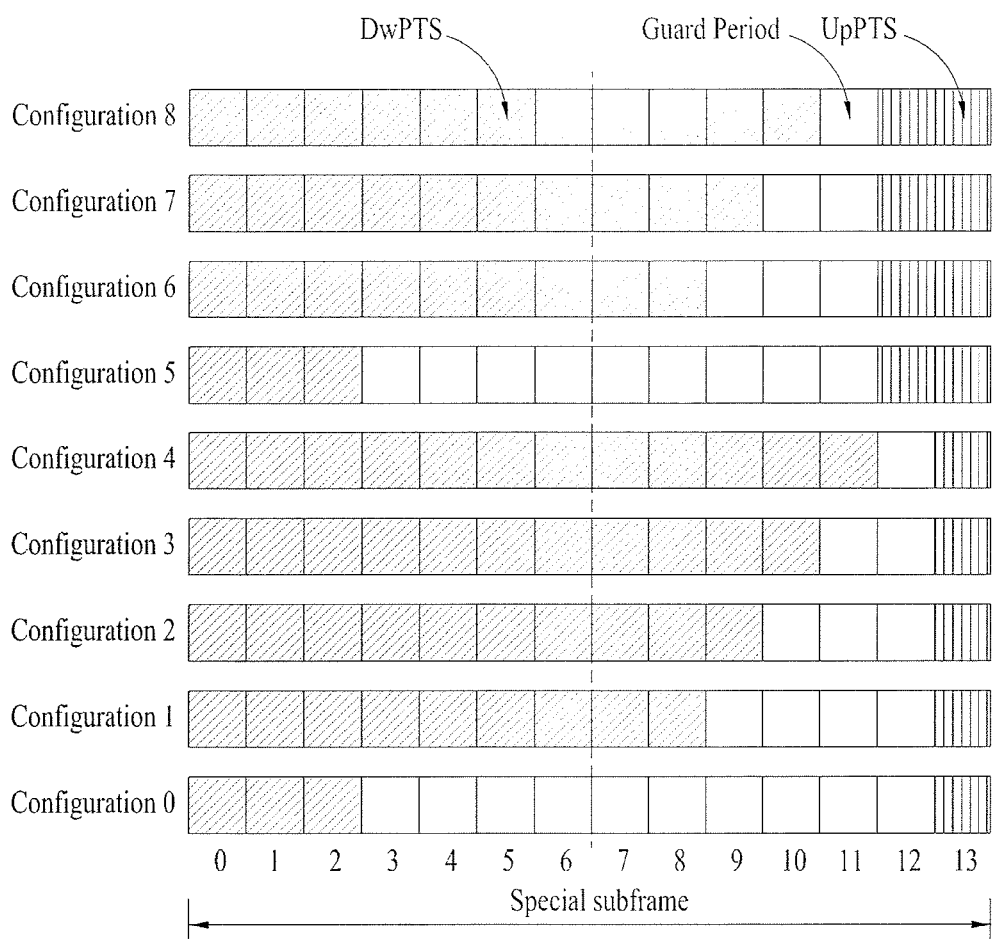
FIG. 14 is a diagram illustrating the number of OFDM symbols of DwPTS, GP, and UpPTS according to configuration of Table 2.

FIG. 14 is a diagram illustrating the number of OFDM symbols of a downlink period (for example, DwPTS), a guard period (GP), and an uplink period (for example, UpPTS) according to configuration of Table 2. For convenience, it is assumed that normal CP is used (that is, 14 symbols per subframe). Referring to FIG. 14, the number of symbols that may be used in the uplink period (for example, UpPTS) is varied depending on special subframe configuration. For example, in case of special subframe configurations #0 to #4, the last one symbol may only be used for the uplink period (for example, UpPTS). On the other hand, in case of special subframe configurations #5 to #8, last two symbols (12th and 13th symbols) may be used for the uplink period (for example, UpPTS).

FIG. 15 is a diagram illustrating that uplink data are transmitted for both a special (S) subframe and UL subframe in accordance with a method 2. In FIG. 5, it is noted that subframe SF #n is a special subframe, and subframe SF #n+1 is UL subframe. Referring to Table 1, in case of TDD UL-DL configurations #0, #1, #2 and #6, n may be 1 or 6 (n=1 or n=6). In case of TDD UL-DL configurations #3, #4 and #5, n may be 1 (n=1). Although FIG. 15 illustrates that a resource for uplink data transmission is allocated to one RB, the resource for uplink data transmission may be allocated to a plurality of RBs.

Referring to FIG. 15(a), if the special subframe is set to one of special subframe configurations #0 to 4 at SF #n, uplink data is transmitted for both the special subframe and the UL subframe. In FIG. 15(a), the number of symbols included in the uplink period (for example, UpPTS) within the special subframe is 1.

Referring to FIG. 15(b), if the special subframe is set to one of special subframe configurations #5 to 8 at SF #n, uplink data is transmitted for both the special subframe and the UL subframe. In FIG. 15(b), the number of symbols included in the uplink period (for example, UpPTS) within the special subframe is 2.

In FIG. 15, if the UL subframe is selectively configured to transmit the uplink data through separate signaling, the uplink data may be transmitted at only SF #n+1, which is originally scheduled, without being transmitted at SF #n.

As a modification (method 2-1) of the method 2, if at least a part of the uplink period (for example, UpPTS) within the special (S) subframe is set to cell-specific SRS timing, UL data transmission period may be limited to a scheduled UL subframe, and if the entire uplink period (for example, UpPTS) within the special (S) subframe is not set to cell-specific SRS timing, the method 2 may be used.

For example, in FIG. 15, the cell-specific SRS may be set to be transmitted at the last one symbol or the last two symbols of the subframe #n. In this case, the UL data transmission period may be limited to the UL subframe SF #n+1 regardless of signaling as to whether uplink data will be transmitted at the special subframe SF #n. By contrast, if the cell-specific SRS is not set to be transmitted at the uplink period (for example, UpPTS) of the special subframe SF #n, one symbol or two symbols of the subframe SF #n may be included in the UL data transmission period together with the UL subframe SF #n+1 in accordance with the method 2.

As another modification (method 2-2) of the method 2, if the entire uplink period (for example, UpPTS) within the special (S) subframe is set to cell-specific SRS timing, the UL data transmission period may be limited to a scheduled UL subframe, and if the uplink period (for example, UpPTS) which is not set to cell-specific SRS timing exists within the special (S) subframe, the method 2 may be used.

For example, if the cell-specific SRS is set to be transmitted at the last symbol of the special subframe #n of FIG. 15(a), the UL data transmission period may be limited to the UL subframe SF #n+1 regardless of signaling as to whether uplink data will be transmitted at the special subframe SF #n. By contrast, if the cell-specific SRS is not set to be transmitted at the last symbol of the special subframe SF #n, one symbol of the subframe SF #n may be included in the UL data transmission period together with the UL subframe SF #n+1 in accordance with the method 2.

Also, for example, if the cell-specific SRS is set to be transmitted at the last two symbols of the special subframe #n of FIG. 15(b), the UL data transmission period may be limited to the UL subframe SF #n+1 regardless of signaling as to whether uplink data will be transmitted at the special subframe SF #n. However, if the cell-specific SRS is set to be transmitted at the last symbol only of the special subframe #n of FIG. 15(b), the symbol of SF #n at which the cell-specific SRS is not transmitted may be included in the UL data transmission period. Likewise, if the cell-specific SRS is not set to be transmitted at the special subframe SF #n, two symbols of the subframe SF #n may be included in the UL data transmission period in accordance with the method 2.

As still another modification (method 2-3) of the method 2, if a reception timing of UL grant for scheduling UL subframe existing just next to the special subframe is set to a timing prior to UL subframe as much as the number of special subframes, the method 2 may be used. If the reception timing of UL grant is set to the timing subsequent to the UL subframe including subframe having an interval equivalent to the number of special subframes from the UL subframe, the UL data transmission period may be limited to a scheduled UL subframe. In this way, if the interval equivalent to the number of special subframes exists between the reception timing of UL grant and UL subframe scheduled by the UL grant, the timing for UL data transmission may be obtained stably. For example, supposing that UL subframe timing which is scheduled is SF #n, if the UL grant reception timing is set to the timing prior to SF #(n−k), the method 2 may be applied, and if the UL grant reception timing is set to the timing subsequent to SF #(n–k) including the timing corresponding to SF #(n–k), UL data may be transmitted at the UL subframe SF #n only. For example, k may be 4 (k=4).

For example, if k is 4 (k=4), referring to Table 7, the UL grant reception timing for subframes #2 and #7 located just next to the special subframe may be subframes #6 and #1, respectively, in case of TDD UL-DL configuration #0. Accordingly, since the interval between the UL grant reception timing and the UL data transmission timing is 6, for example, which is greater than 4, stable timing may be obtained. Accordingly, as the method 2 is applied in case of the TDD UL-DL configuration #0, the uplink period (for example, UpPTS) of the subframe #1 existing just prior to the subframe #2 may be included in the uplink data transmission period. On the other hand, the UL grant reception timing for subframes #2 and #7 located just next to the special subframe may be subframes #3 and #8, respectively, in case of TDD UL-DL configuration #2. Accordingly, since the interval between the UL grant reception timing and the UL data transmission timing is 4, for example, stable timing may not be obtained. Accordingly, in case of the TDD UL-DL configuration #2, the method 2 is not applied and the UL data transmission period may be limited to subframes #2 and 7.

Although the methods 1 and 2 have been described independently, a new method may be configured by combination of the methods 1 and 2. For example, in a combined method (method 2-4) of the methods 1 and 2, if UL subframe exists just next to the special subframe in TDD based NCT carrier, a symbol period including the uplink period (for example, UpPTS) within the corresponding special subframe to the last symbol of the corresponding UL subframe may be allocated as the corresponding UL data transmission period.

As further still another modification (method 2-5) of the method 2, if one UL data transmission period is scheduled/set for the uplink period (for example, UpPTS) of the special subframe and UL SF, a method for transmitting a DMRS symbol to additionally obtained uplink period (for example, UpPTS) may be considered. In this case, additional DMRS may be transmitted, whereby uplink data detection/reception throughput at the base station may be improved. Also, if one UL data is scheduled/transmitted for the uplink period (for example, UpPTS) of the special subframe and UL SF, whether UL data or DMRS symbol will be transmitted to additionally obtained uplink period (for example, UpPTS) may be set previously through RRC signaling, or may be indicated explicitly or implicitly through UL grant (for example, PDCCH) for scheduling (corresponding) UL subframe.

Hereinafter, if one UL data is transmitted for the uplink period (for example, UpPTS) of the special subframe and next UL subframe, a method for determining a transport block size by using the method 2 will be described. For example, in the 3GPP LTE (Rel-8/9/10) system, the transport block size may be expressed by combination of the number of RBs designated by UL grant and a modulation and coding scheme (MCS). Table 8 illustrates a relation between an index $I_{MCS}$ received through a modulation and coding scheme and redundancy version field of the UL grant and a transport block size index $I_{TBS}$.

TABLE 8

| MCS Index $I_{MCS}$ | Modulation Order $Q_m'$ | TBS Index $I_{TBS}$ | Redundancy Version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Also, the user equipment may receive a resource indication value (RIV) through a resource block allocation and hopping resource allocation field of UL grant and then obtain a length of a resource block which is allocated and a starting location of the resource block. If the length of the resource block and its starting location are determined, the user equipment may obtain the number of physical resource blocks (PRBs). Supposing that the number of physical resource blocks is $N_{PRB}$, $N_{PRB}$ and $I_{TBS}$ may be applied to a conversion table, whereby the transport block size may be obtained. If the transport block is not mapped by 2-layer spatial multiplexing, the conversion table may depend on Table 7.1.7.2.1-1 illustrated in 3GPP TS (Technical Specification) 36.213 version 10.6.0. In Table 7.1.7.2.1-1, the transport block size may be obtained by applying $N_{PRB}$ and $I_{TBS}$. The 3GPP TS (Technical Specification) 36.213 version 10.6.0 is included in this specification as a reference.

If the transport block is mapped by 2-layer spatial multiplexing, the transport block size may be calculated differently depending on the value of $N_{PRB}$. In case of $1 \leq N_{PRB} \leq 55$, instead of $(I_{TBS}, N_{PRB})$, $(I_{TBS}, 2 \times N_{PRB})$ may be applied to Table 7.1.7.2.1-1 of the conversion table of the 3GPP TS 36.213 version 10.6.0, whereby the transport block size may be obtained. In case of $56 \leq N_{PRB} \leq 110$, $(I_{TBS}, N_{PRB})$ may be applied to Table 7.1.7.2.1-1 of the conversion table of the 3GPP TS 36.213 version 10.6.0 to obtain the transport block size TBS_L1, and then TBS_L1 is converted to TBS_L2 in accordance with Table 7.1.7.2.2-1 of the conversion table of the 3GPP TS 36.213 version 10.6.0, whereby a final transport block size may be obtained.

Accordingly, if the base station designates the number of RBs and the MCS through UL grant, the number of bits which are automatically transmitted may be determined. However, the transport block size may be required to be adjusted as much as the number of available SC-FDMA symbols which are increased for UL data transmission. For example, if UL data is transmitted by combination of the uplink period (for example, UpPTS) of the special subframe and the UL subframe in the same manner as the method 2, the number of SC-FDMA symbols more than that corresponding to the case where UL data is transmitted through normal UL subframe may be used. Accordingly, if the uplink period (for example, UpPTS) is used for UL data transmission in accordance with the method 2, a new transport block size table suitable for the number of symbols which are increased may be required.

A method for determining the transport block size when the number of symbols at which the UL data is transmitted is increased will be suggested. According to this method, a value obtained by multiplying a specific weighting factor by the number $N'_{PRB}$ of RBs which are actually allocated through UL grant may be regarded as the number $N_{PRB}$ of RBs defined in a corresponding transport block size table while referring to the conventional transport block size table defined for normal UL subframe, whereby the transport block size may be determined based on the number $N_{PRB}$ of RBs. For example, the corresponding weighting factor may be determined by a ratio between the number of SC-FDMA symbols available at the normal UL subframe and the number of SC-FDMA symbols available at the method 2 (combined period of uplink period (for example, UpPTS) and normal UL subframe). For example, supposing that the number of SC-FDMA symbols that may be allocated for UL data transmission within the uplink period (for example, UpPTS) is $N_u$ when the uplink period (for example, UpPTS) is additionally used for UL data transmission, $N_u$ may be 1 or 2 depending on special subframe configuration as described above. Also, for example, supposing that the number of SC-FDMA symbols that may be used for UL data transmission at the normal UL subframe is $N_s$, the number $N_s$ of SC-FDMA symbols may be determined as 11 or 12 in case of normal CP and 9 or 10 in case of extended CP depending on whether SRS is transmitted at symbols except for the number of symbols at which the DMRS is transmitted, as described above. For example, if the uplink period (for example, UpPTS) of the special subframe is included in the uplink data transmission period, the weighting factor may be determined as $(N_s+N_u)/N_s$ and the number of resource blocks may be determined by the following Equation 1.

$$N_{PRB}=\max\{\lfloor N'_{PRB}\times(N_s+N_u)/N_s\rfloor,1\} \quad \text{[Equation 1]}$$

Table 9 illustrates the weighting factor $(N_s+N_u)/N_s$ based on $N_u$ and N. In Table 9, $N_s$ may represent the number of symbols allocated for uplink data transmission at the UL subframe which is scheduled through the UL grant, and $N_u$ may represent the number of symbols at which uplink data may be transmitted at the uplink period (for example, UpPTS) of the special subframe.

TABLE 9

| | $N_s$ | | | |
|---|---|---|---|---|
| $N_u$ | 9 | 10 | 11 | 12 |
| 1 | 1.111 | 1.100 | 1.091 | 1.083 |
| 2 | 1.222 | 1.200 | 1.182 | 1.167 |

Although the present invention has been described as above on the basis of the NCT carrier, it is to be understood that the present invention is not limited to the NCT carrier. For example, the present invention may be applied to the system configured by the LCT carrier only.

Figure 16:
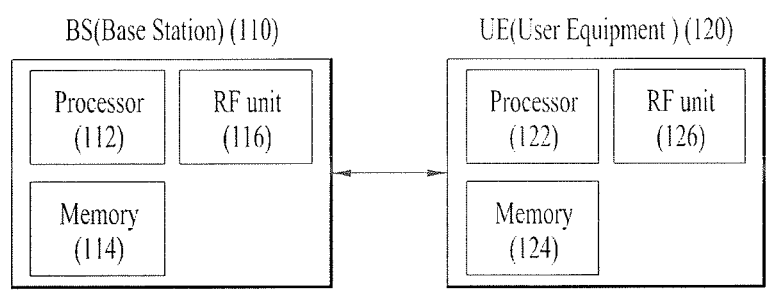
FIG. 16 is a diagram illustrating a base station and a user equipment that may be applied to the present invention.

FIG. 16 is a block diagram illustrating a base station and a user equipment that may be applied to the present invention.

Referring to FIG. 16, the wireless communication system includes a base station (BS) 110 and a user equipment (UE) 120. If the wireless communication system includes a relay, the base station or the user equipment may be replaced with the relay.

The base station 110 includes a processor 112, a memory 114, and a radio frequency (RF) unit 116. The processor 112 may be configured to implement functions, procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement functions, procedures and/or methods suggested in the present invention. The memory 124 is connected with the processor 122 and stores various kinds of information related to the operation of the processor 122. The RF unit 126 is connected with the processor 122 and transmits and/or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for the wireless communication system such as the user equipment and the base station.

The invention claimed is:

1. A method for transmitting an uplink signal by a user equipment in a time division duplex (TDD)-based wireless communication system, the method comprising:
   receiving scheduling information for data transmission in a first uplink subframe; and
   transmitting uplink data in accordance with the scheduling information,
   wherein a transmission period for the uplink data includes the first uplink subframe,
   wherein when a second subframe just before the first uplink subframe is a subframe including a downlink period, a guard period and an uplink period, and when a predetermined condition is satisfied, the transmission period further includes the uplink period of the second subframe, and a size of the uplink data is determined using second information about the number of resource blocks obtained by multiplying a specific weighting factor by first information about the number of resource blocks included in the scheduling information, and
   wherein the second information about the number of resource blocks is determined by $N_{PRB} = \max\{\lfloor N'_{PRB} \times (N_s + N_u)/N_s \rfloor, 1\}$, where $N'_{PRB}$ corresponds to the first information about the number of resource blocks, $N_{PRB}$ corresponds to the second information about the number of resource blocks, $N_s$ represents the number of symbols allocated for transmission of the uplink data, and $N_u$ represents the number of symbols at which the uplink data can be transmitted at the uplink period of the second subframe.

2. The method according to claim 1, wherein the predetermined condition includes that the scheduling information includes a specific indicator or a specific field of the scheduling information has a predetermined value.

3. The method according to claim 1, further comprising:
   receiving control information through radio resource control (RRC) layer signaling,
   wherein the predetermined condition includes that the control information includes a specific indicator.

4. The method according to claim 1, wherein the predetermined condition includes that an uplink reference signal is not configured to be transmitted through at least part of the uplink period of the second subframe.

5. The method according to claim 1, wherein the predetermined condition includes that an interval between a subframe at which the scheduling information is received and the uplink subframe is greater than a specific number of subframes.

6. A user equipment configured to transmit an uplink signal in a time division duplex (TDD)-based wireless communication system, the user equipment comprising:
   a radio frequency (RF) module; and
   a processor, wherein the processor is configured to:
      receive scheduling information for data transmission in a first uplink subframe, and
      transmit uplink data in accordance with the scheduling information,
   wherein a transmission period for the uplink data includes the first uplink subframe,
   wherein when a second subframe just before the first uplink subframe is a subframe including a downlink period, a guard period and an uplink period, and when a predetermined condition is satisfied, the transmission period further includes the uplink period of the second subframe, and a size of the uplink data is determined using second information about the number of resource blocks obtained by multiplying a specific weighting factor by first information about the number of resource blocks included in the scheduling information, and
   wherein the second information about the number of resource blocks is determined by $N_{PRB} = \max\{\lfloor N'_{PRB} \times (N_s + N_u)/N_s \rfloor, 1\}$, where $N'_{PRB}$ corresponds to the first information about the number of resource blocks, $N_{PRB}$ corresponds to the second information about the number of resource blocks, $N_s$ represents the number of symbols allocated for transmission of the uplink data, and $N_u$ represents the number of symbols at which the uplink data can be transmitted at the uplink period of the second subframe.

7. The user equipment according to claim 6, wherein the predetermined condition includes that the scheduling information includes a specific indicator or a specific field of the scheduling information has a predetermined value.

8. The user equipment according to claim 6, wherein the processor is further configured to receive control information through radio resource control (RRC) layer signaling, and the predetermined condition includes that the control information includes a specific indicator.

9. The user equipment according to claim 6, wherein the predetermined condition includes that an uplink reference signal is not configured to be transmitted through at least part of the uplink period of the second subframe.

10. The user equipment according to claim 6, wherein the predetermined condition includes that an interval between a subframe at which the scheduling information is received and the uplink subframe is greater than a specific number of subframes.

* * * * *